United States Patent
Yoshihara et al.

(10) Patent No.: US 7,176,879 B1
(45) Date of Patent: Feb. 13, 2007

(54) DISPLAY DEVICE AND DISPLAY METHOD

(75) Inventors: Toshiaki Yoshihara, Kawasaki (JP); Tetsuya Makino, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 10/722,912

(22) Filed: Nov. 26, 2003

(30) Foreign Application Priority Data

Dec. 13, 2002 (JP) .............................. 2002-362345

(51) Int. Cl.
G09G 3/36 (2006.01)
(52) U.S. Cl. ..................... 345/102; 345/88; 345/99
(58) Field of Classification Search ............ 345/87–89, 345/98–100, 102, 204
See application file for complete search history.

(56) References Cited

U.S. PATENT DOCUMENTS

| | | | | |
|---|---|---|---|---|
| 5,122,791 | A * | 6/1992 | Gibbons et al. | ............. 345/102 |
| 5,416,496 | A * | 5/1995 | Wood | ......................... 345/102 |
| 6,115,016 | A * | 9/2000 | Yoshihara et al. | ............ 345/88 |
| 6,570,554 | B1 * | 5/2003 | Makino et al. | ............. 345/102 |

FOREIGN PATENT DOCUMENTS

JP 11-119189 4/1999

OTHER PUBLICATIONS

Yoshihara et al.; "A Full-color FLC Display Based on Field Sequential Color with TFTs"; *AM-LCD '99 Digest of Technical Papers*; pp. 185-188; Jul. 14-16, 1999.
Yoshihara et al.; "Invited Papers: A 254-ppi Full-color Video Rate TFT-LCD Based on Field Sequential Color and FLC Display"; *SID '00 Digest of Technical Papers*; pp. 1176-1177; May 2000.

* cited by examiner

*Primary Examiner*—Regina Liang
(74) *Attorney, Agent, or Firm*—Greer, Burns & Crain, Ltd.

(57) ABSTRACT

One frame is divided into three sub-frames of red, green and blue colors, and, in each sub-frame, the time ($T_A$) necessary for writing scanning, the time ($T_C$) necessary for erasing scanning, the time ($T_B$) from the end timing of writing scanning to the start timing of erasing scanning, and the time ($T_D$) from the end timing of erasing scanning to the start timing of writing scanning of the next color (the next sub-frame) are each 25% of the sub-frame. The relations $T_B + T_C = T_A + T_D$, and $T_B = T_D$ are satisfied. A back-light is turned on during the time from the start timing of writing scanning to the end timing of erasing scanning, and is turned off during the time from the end timing of erasing scanning to the start timing of writing scanning of the next color. The ON time of the back-light is 75% of the sub-frame.

29 Claims, 16 Drawing Sheets

DISPLAY DEVICE AND DISPLAY METHOD

BACKGROUND OF THE INVENTION

The present invention relates to a field-sequential type display device and display method for performing a display by synchronizing the switching of colors of light to be incident on an optical switching element with the inputting of display data of respective colors corresponding to a display image to the optical switching element, and also relates to a color-filter type display device and display method for performing a color display by synchronizing the incidence of white light on an optical switching element having color filters with the inputting of display data of respective colors corresponding to a display image to the optical switching element.

Along with the recent development of so-called information-oriented society, electronic apparatuses, such as personal computers and PDA (Personal Digital Assistants), have been widely used. With the spread of such electronic apparatuses, portable apparatuses that can be used in offices as well as outdoors have been used, and there are demands for small-size and light-weight of these apparatuses. Liquid crystal display devices are widely used as one of the means to satisfy such demands. Liquid crystal display devices not only achieve small size and light weight, but also include an indispensable technique in an attempt to achieve low power consumption in portable electronic apparatuses that are driven by batteries.

The liquid crystal display devices are mainly classified into the reflection type and the transmission type. In the reflection type liquid crystal display devices, light rays incident from the front face of a liquid crystal panel are reflected by the rear face of the liquid crystal panel, and an image is visualized by the reflected light; whereas in the transmission type liquid crystal display devices, the image is visualized by the transmitted light from a light source (back-light) placed on the rear face of the liquid crystal panel. Since the reflection type liquid crystal display devices have poor visibility because the reflected light amount varies depending on environmental conditions, transmission type color liquid crystal display devices are generally used as the display devices of personal computers displaying full-color images.

As the color liquid crystal display devices, TN (Twisted Nematic) type liquid crystal display devices using switching elements such as a TFT (Thin Film Transistor) are widely used. Although the TFT-driven TN type liquid crystal display devices have better display quality compared to an STN (Super Twisted Nomadic) type, they require a back-light with high intensity to achieve high screen brightness because the light transmittance of the liquid crystal panel is only 4% or so at present. For this reason, a lot of power is consumed by the back-light. Moreover, since a color display is achieved using color filters, a single pixel needs to be composed of three sub-pixels, and there are problems that it is difficult to provide a high-definition display, and the purity of the displayed colors is not sufficient.

In order to solve such problems, the present inventor et al. developed field-sequential type liquid crystal display devices (see, for example, T. Yoshihara et al., AM-LCD '99 Digest of Technical Papers, p. 185, 1999; and T. Yoshihara et al., SID '00 Digest of Technical Papers, p. 1176, 2000). Since such a field-sequential type liquid crystal display device does not require sub-pixels, it is possible to easily achieve a higher definition display compared to a color-filter type liquid crystal display device. Moreover, since the field-sequential type liquid crystal display device can use the color of light emitted by the light source as it is for display without using a color filter, the displayed color has excellent purity. Furthermore, since the light utilization efficiency is high, this device has the advantage of low power consumption. However, in order to realize a field-sequential type liquid crystal display device, a high-speed responsiveness (2 ms or less) of liquid crystal is essential.

In order to increase the speed of response of a filed-sequential type liquid crystal display device with significant advantages as mentioned above or of a color-filter type liquid crystal display device, the present inventor et al. are conducting research and development on the driving of liquid crystal such as a ferroelectric liquid crystal having spontaneous polarization, which may achieve 100 to 1000 times faster response compared to a prior art, by a switching element such as a TFT (Thin Film Transistor). In the ferroelectric liquid crystal, as shown in FIG. 1, with the application of voltage, the long-axis direction of the liquid crystal molecule is tilted. A liquid crystal panel sandwiching the ferroelectric liquid crystal therein is sandwiched by two polarization plates whose polarization axes are orthogonal to each other, and the intensity of the transmitted light is changed using the birefringence caused by the change in the long-axis direction of the liquid crystal molecule.

FIG. 2 illustrates an example of time chart of display control in a conventional filed-sequential type liquid crystal display device. FIG. 2(a) shows the scanning timing of each line of the liquid crystal panel, and FIG. 2(b) shows the ON timing of red, green and blue colors of the back-light. One frame is divided into three sub-frames, and, for example, as shown in FIG. 2(b), red light is emitted in the first sub-frame, green light is emitted in the second sub-frame, and blue light is emitted in the third sub-frame.

Meanwhile, as shown in FIG. 2(a), for the liquid crystal panel, image data writing scanning and erasing scanning are performed within a sub-frame of each of red, green and blue colors. However, the timings are adjusted so that the start timing of the writing scanning coincides with the start timing of each sub-frame, and the end timing of the erasing scanning coincides with the end timing of each sub-frame, and the time necessary for each of the writing scanning and the erasing scanning is set to a half of each sub-frame. During the writing scanning and the erasing scanning, voltages which are equal in magnitude and different in polarity corresponding to the same image data are applied to the liquid crystal panel. Moreover, the light emission time of each color is equal to the time of a sub-frame (see, for example, Japanese Patent Application Laid-Open No. 11-119189/1999).

Accordingly, the amount of light actually used for display is about a half of the amount of the emitted light. This is due to the fact that the time in which the light is transmitted from the liquid crystal panel as the optical switching element is about a half of the time of a sub-frame. More specifically, even after the erasing scanning, although the same image as that displayed after the writing scanning is displayed with very low brightness compared to the image after the writing scanning, this image is actually perceived as a "black image", and therefore the time in which the light is transmitted through the liquid crystal panel is about a half of the time of a sub-frame.

Note that in this specification, scanning for obtaining a display image with high brightness is called "writing scanning", while, scanning for obtaining an image with low brightness or a black image is called "erasing scanning".

A field-sequential type liquid crystal display device has the advantages of high light utilization efficiency and reducing power consumption compared to a color-filter type liquid crystal display device. However, since it utilizes only about a half of the light from the light source for display as described above, there is a demand for a further improvement in light utilization efficiency. Similarly, in a color-filter type liquid crystal display device using a ferroelectric liquid crystal material, since the writing scanning and the erasing scanning are performed by respectively using a half of the time of each frame, there is a problem that only about a half of the light emitted by the light source is utilized for display.

BRIEF SUMMARY OF THE INVENTION

The present invention has been made with the aim of solving the above problems, and it is an object of the present invention to provide a display device and display method capable of improving the light utilization efficiency, without causing deterioration in the displayed image quality, particularly a decrease in the brightness.

A display device according to a first aspect is a field-sequential type display device for performing a display by synchronizing successive switching of lights of a plurality of colors to be incident on an optical switching element from a light source with inputting of display data of each color corresponding to an image to be displayed into the optical switching element, and comprises: light introducing means for making light of a corresponding color from the light source incident on the optical switching element in synchronism with a start timing of display data writing scanning on the optical switching element for each color; and interrupting means for interrupting the incidence of light of a corresponding color from the light source on the optical switching element in synchronism with an end timing of display data erasing scanning on the optical switching element for each color, wherein a predetermined time is provided between an interruption timing of incidence of light of one color on the optical switching element and a start timing of incidence of light of the next color on the optical switching element.

A display method according to a thirteenth aspect is a display method for performing a field-sequential type display by synchronizing successive switching of lights of a plurality of colors to be incident on an optical switching element from a light source with inputting of display data of each color corresponding to an image to be displayed into the optical switching element, and comprises: making light of a corresponding color from the light source incident on the optical switching element in synchronism with a start timing of display data writing scanning on the optical switching element for each color; and interrupting the incidence of light of a corresponding color from the light source on the optical switching element in synchronism with an end timing of display data erasing scanning on the optical switching element for each color, wherein a predetermined time is provided between an interruption timing of incidence of light of one color on the optical switching element and a start timing of incidence of light of the next color on the optical switching element.

In the first and thirteenth aspects, light of a corresponding color is incident on the optical switching element in synchronism with the start timing of display data writing scanning on the optical switching element for each color, the incidence of light of a corresponding color on the optical switching element is interrupted in synchronism with the end timing of display data erasing scanning on the optical switching element for each color, and a predetermined time is provided between the interruption of incidence of light of one color on the optical switching element and the incidence of light of the next color on the optical switching element. The light emission time of the light source can be shortened while maintaining the time necessary for the transmission of light from the light source through the optical switching element to be equal to or more than a conventional one, i.e., without deteriorating the displayed image quality. As a result, it is possible to improve the light utilization efficiency.

A display device according to a second aspect is the device of the first aspect, wherein the predetermined time is equal to a time from an end timing of display data writing scanning on the optical switching element to a start timing of display data erasing scanning on the optical switching element. In the second aspect, the predetermined time from the interruption of incidence of light of one color on the optical switching element to the incidence of light of the next color on the optical switching element is made equal to the time from the end timing of display data writing scanning on the optical switching element to the start timing of display data erasing scanning on the optical switching element. Therefore, if a liquid crystal display element is used as a display element, it is possible to easily reduce the deviation of voltage of positive polarity and negative polarity to be applied to the liquid crystal material, and prevent burn-in of the display.

A display device according to a third aspect is a field-sequential type display device for performing a display by synchronizing successive switching of lights of a plurality of colors to be incident on an optical switching element from a light source with inputting of display data of each color corresponding to an image to be displayed into the optical switching element, wherein an end timing of display data writing scanning on the optical switching element and a start timing of display data erasing scanning on the optical switching element for each color do not coincide, and a relation $T_B+T_C=T_A+T_D$ is satisfied, where $T_A$ is a time necessary for the writing scanning, $T_B$ is a time from the end timing of writing scanning to the start timing of erasing scanning, $T_C$ is a time necessary for the erasing scanning, and $T_D$ is a time from the end timing of erasing scanning to a start timing of display data writing scanning on the optical switching element for the next color.

In the third aspect, the end timing of display data writing scanning on the optical switching element and the start timing of display data erasing scanning on the optical switching element for each color do not coincide, and the sum of the time ($T_B$) from the end timing of writing scanning to the start timing of erasing scanning and the time ($T_C$) necessary for the erasing scanning is made equal to the sum of the time ($T_A$) necessary for the writing scanning and the time ($T_D$) from the end timing of erasing scanning to the start timing of display data writing scanning on the optical switching element for the next color. Therefore, if a liquid crystal display element is used as a display element, the time in which voltage of positive polarity is applied to the liquid crystal material and the time in which voltage of negative polarity is applied are equal, and it is possible to prevent image sticking of the display.

A display device according to a fourth aspect is a field-sequential type display device for performing a display by synchronizing successive switching of lights of a plurality of colors to be incident on an optical switching element from a light source with inputting of display data of each color corresponding to an image to be displayed into the optical switching element, and comprises: light introducing means for making light of a corresponding color from the light source incident on the optical switching element before a start timing of display data writing scanning on the optical switching element for each color; and interrupting means for interrupting the incidence of light of a corresponding color from the light source on the optical switching element after an end timing of display data erasing scanning on the optical switching element for each color.

In the fourth aspect, light of a corresponding color is incident on the optical switching element before the start timing of display data writing scanning on the optical switching element for each color, and the incidence of light of a corresponding color on the optical switching element is interrupted after the end timing of display data erasing scanning on the optical switching element for each color. Accordingly, when the writing scanning of display data of each color is started, light of a corresponding color is surely incident on the optical switching element, and the incidence of light of a corresponding color is surely interrupted after finishing the erasing scanning of display data of each color. It is therefore possible to perform a light emitting sequence that takes into account the responsiveness of the light source, or increase the margin of driving synchronization in light emission between the optical switching element and the light source.

A display device according to a fifth aspect is any one of the devices of the first through fourth aspects, wherein the lights of a plurality of colors to be incident on the optical switching element are red light, green light, and blue light. In the fifth aspect, since the lights of a plurality of colors to be incident on the optical switching element are red light, green light, and blue light, it is possible to provide a full-color display. Besides, in the case of monochrome displays of red, green, or blue, the time during which the light source is turned off becomes longer, thereby achieving a significant reduction in power consumption.

A display device according to a sixth aspect is any one of the devices of the first through fourth aspects, wherein the lights of a plurality of colors to be incident on the optical switching element are red light, green light, blue light, and white light. In the sixth aspect, since the lights of a plurality of colors to be incident on the optical switching element are red light, green light, blue light, and white light, it is possible to provide a full-color display. Besides, in the case where the grayscale numbers r, g and b of red, green and blue display data are converted into the grayscale numbers of display data of four colors, r'=r−w, g'=g−w, b'=b−w, and w, by the grayscale number w of white display data that is common data of the three colors, the grayscale number w of white is usually the lowest grayscale number among the grayscale numbers r, g and b of red, green and blue, and at least one of the grayscale numbers r', g' and b' after conversion is 0. Consequently, the probability of making the light source off increases. In particular, in the case of a black-and-white display, since the light source is turned on only in the white sub-frame and turned off in the red, green and blue sub-frames, it is possible to achieve a significant reduction in power consumption. Note that the advantage of significant reduction in power consumption for monochrome displays of red, green or blue is the same as in the fifth aspect.

A display device according to a seventh aspect is any one of the devices of the first through sixth aspects, wherein the device further comprises control means for controlling, based on display data, ON/OFF of the light source for emitting light of a color corresponding to the display data. In the seventh aspect, the ON/OFF of the light source is controlled according to the grayscale number of display data of each color. Accordingly, the light source is turned off if it is not necessary, thereby achieving a reduction in power consumption.

A display device according to an eighth aspect is any one of the devices of the first through sixth aspects, wherein an irradiation region of light to be incident on the optical switching element is divided, and the display device further comprises control means for controlling, based on display data in each divided region, ON/OFF of the light source for emitting light of a color corresponding to the display data. In the eighth aspect, in each of the divided irradiation regions of light to be incident on the optical switching element, the ON/OFF of the light source is controlled according to the grayscale number of display data of each color. Consequently, finer control is performed, and the ratio of the time in which the light source is turned off increases, thereby achieving a further reduction in power consumption.

A display device according to a ninth aspect is any one of the devices of the first through eighth aspects, wherein the device further comprises stopping means for stopping scanning on the optical switching element when the light source for emitting light of a color corresponding to display data is turned off. In the ninth aspect, when the light source is turned off, drive control of the optical switching element is stopped. Since the display screen of the color when the light source is turned off is a "black image", it is possible to eliminate drive control of the optical switching element which is not necessary for the "black image", and achieve a reduction in power consumption.

A display device according to a tenth aspect is any one of the devices of the first through ninth aspects, wherein the optical switching element is a liquid crystal panel. In the tenth aspect, the power consumption in the light source of the liquid crystal display device is reduced. In the case of a liquid crystal display device, since the power consumed by the light source is about 80 to 90 percent of the total power consumption, the effect of reducing power consumption in the light source of the present invention greatly contributes to a reduction in power consumption in the liquid crystal display device.

A display device according to an eleventh aspect is the device of the tenth aspect, wherein a liquid crystal material used in the liquid crystal panel is a ferroelectric liquid crystal material. In the eleventh aspect, by using the ferroelectric liquid crystal material as the liquid crystal material, it is possible to achieve a high-speed response of 2 ms or less, which is necessary for a field-sequential type liquid crystal display device, and perform a stable display.

A display device according to a twelfth aspect is the device of the tenth or eleventh aspect, wherein an applied voltage to the liquid crystal panel during display data writing scanning and an applied voltage to the liquid crystal panel during display data erasing scanning are equal in magnitude and opposite in polarity. In the twelfth aspect, since the applied voltage to the liquid crystal panel during erasing scanning has equal magnitude and reverse plurality with respect to the applied voltage to the liquid crystal panel during writing scanning, it is possible to reduce the deviation of voltage caused by the voltage application to the liquid crystal panel, thereby preventing image sticking of the display.

A display method according to a fourteenth aspect is a display method for performing a color display by synchronizing incidence of white light from a light source on an optical switching element having color filters of a plurality of colors with inputting of display data of each color corresponding to an image to be displayed into the optical switching element, and comprises: making light from the light source incident on the optical switching element in synchronism with a start timing of display data writing scanning on the optical switching element; and interrupting the incidence of light from the light source on the optical switching element in synchronism with an end timing of display data erasing scanning on the optical switching element, wherein a predetermined time is provided between an interruption timing of incidence of light on the optical switching element in one frame and a start timing of incidence of light on the optical switching element in the next frame.

The characteristics of the above-described first through fourth and the seventh through thirteenth aspects are not limited to a field-sequential type display device and display method, and are also applicable to a color-filter type display device and display method (the fourteenth aspect) for performing a color display by providing the optical switching element (liquid crystal panel) with color filters of a plurality of colors (red, green, blue) and making white light incident on the optical switching element (liquid crystal panel) from the light source.

The above and further objects and features of the invention will more fully be apparent from the following detailed description with accompanying drawings.

DETAILED DESCRIPTION OF THE INVENTION

The following description will specifically explain the present invention with reference to the drawings illustrating some embodiments thereof. Note that although liquid crystal display devices using a liquid crystal panel as an optical switching element are illustrated as examples, the present invention is not limited to the following embodiments.

First Embodiment

Figure 3:
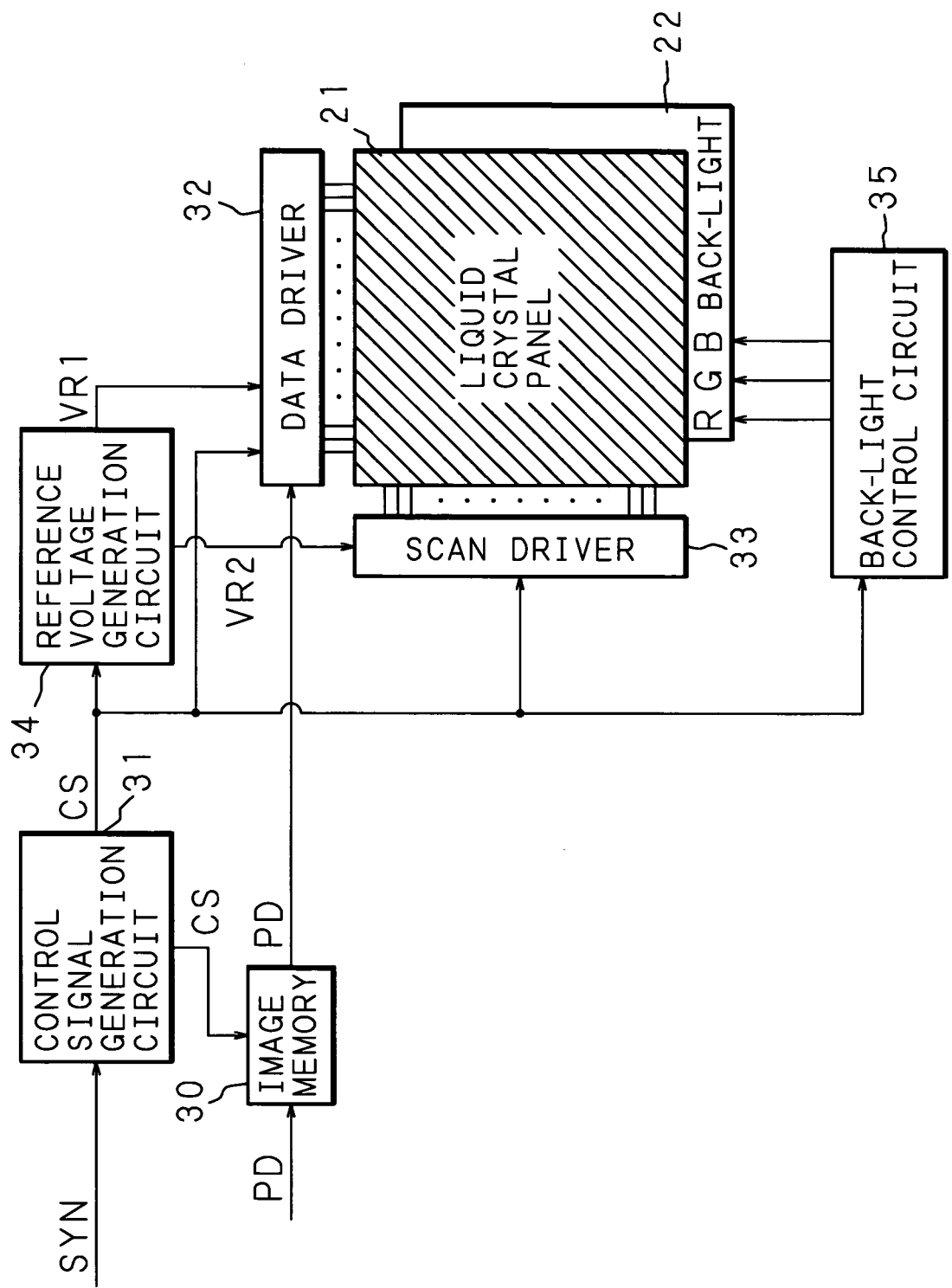
FIG. 3 is a block diagram showing the circuit structure of a liquid crystal display device (the first, second and third embodiments) of the present invention.
Figure 4:
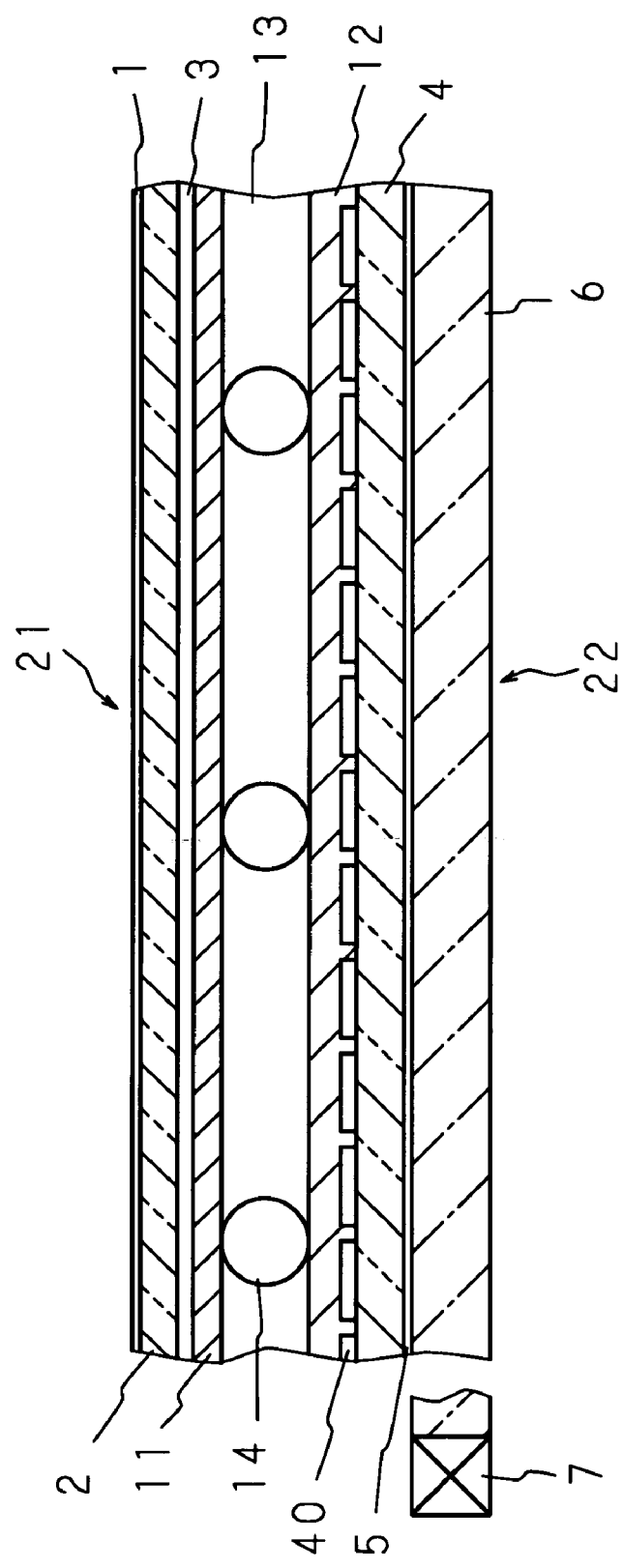
FIG. 4 is a schematic cross sectional view of a liquid crystal panel and a back-light.
Figure 5:
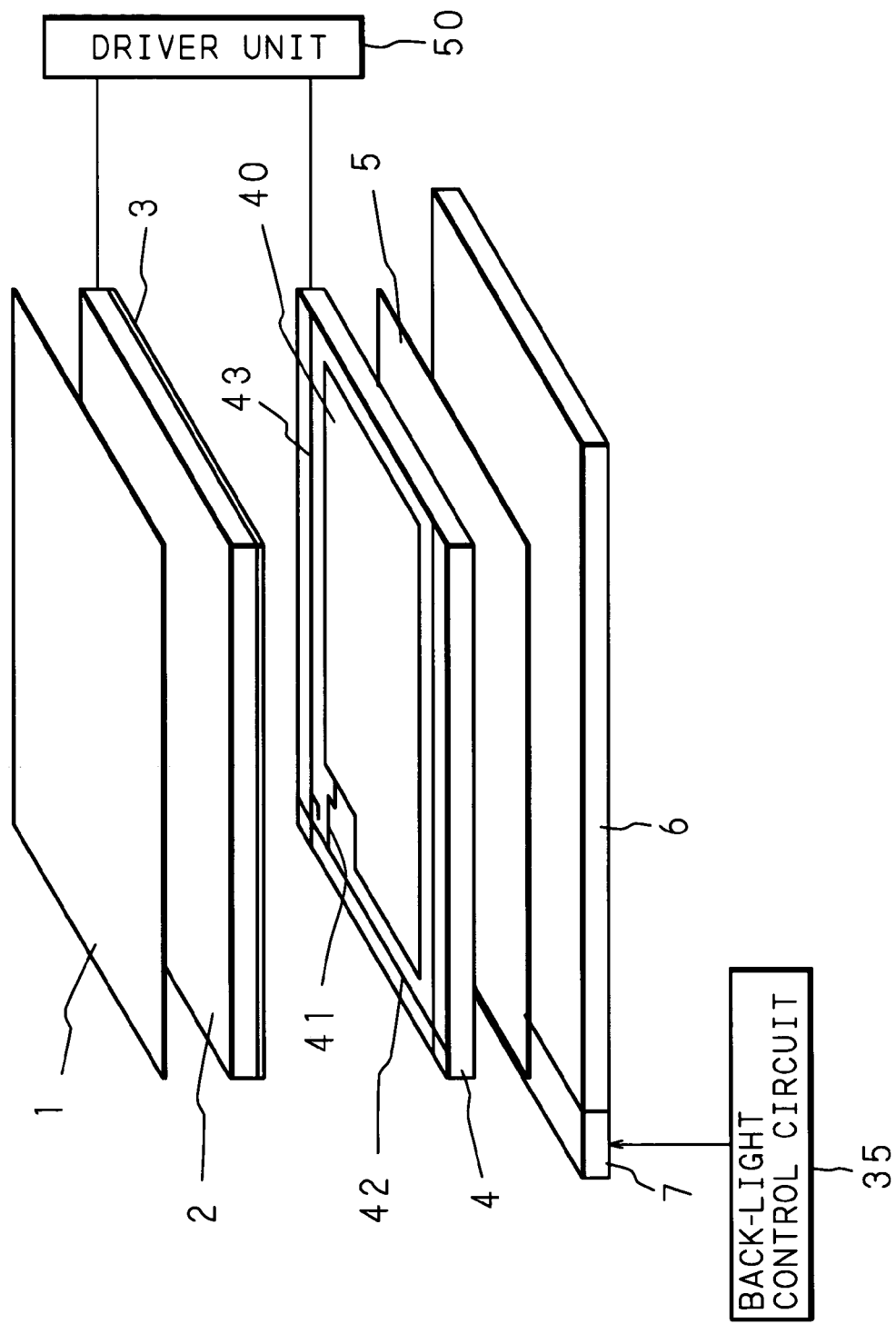
FIG. 5 is a schematic view showing an example of the overall structure of the liquid crystal display device.
Figure 6:
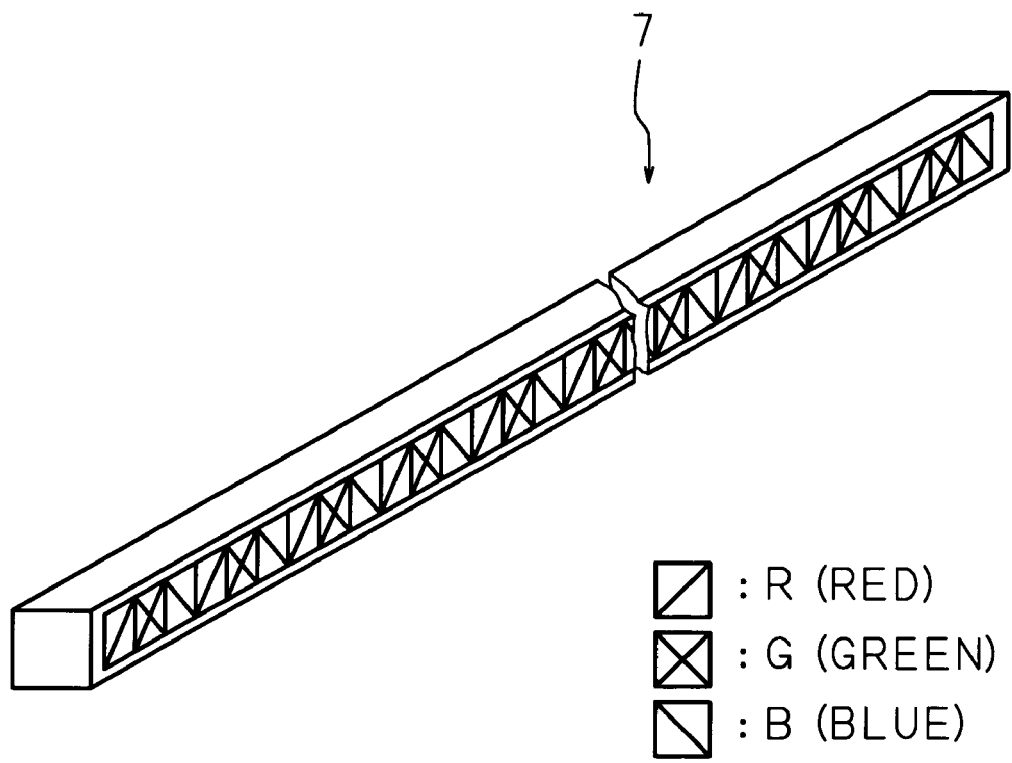
FIG. 6 is a view showing an example of the structure of an LED array.

FIG. 3 is a block diagram showing the circuit structure of a liquid crystal display device of the first embodiment; FIG. 4 is a schematic cross sectional view of a liquid crystal panel and a back-light; FIG. 5 is a schematic view showing an example of the overall structure of the liquid crystal display device; and FIG. 6 is an example of the structure of an LED array as a light source of the back-light.

In FIG. 3, the numerals 21 and 22 represent a liquid crystal panel and a back-light whose cross sectional structures are shown in FIG. 4. As shown in FIG. 4, the back-light 22 comprises an LED array 7 for emitting light of each of red, green and blue colors, and a light guiding/diffusing plate 6.

As shown in FIGS. 4 and 5, the liquid crystal panel 21 comprises a polarization film 1, a glass substrate 2, a common electrode 3, a glass substrate 4 and a polarization film 5, which are stacked in this order from the upper layer (front face) side to the lower layer (rear face) side, and pixel electrodes 40 which are arranged in matrix form on the common electrode 3 side of the glass substrate 4.

A driver unit 50 comprising a data driver 32 and a scan driver 33 is connected between the common electrode 3 and the pixel electrodes 40. The data driver 32 is connected to TFTs 41 through signal lines 42, while the scan driver 33 is connected to the TFTs 41 through scanning lines 43. The TFTs 41 are controlled to be on/off by the scan driver 33. Moreover, each of the pixel electrodes 40 is connected to a TFT 41. Therefore, the intensity of transmitted light of each individual pixel is controlled by a signal given from the data driver 32 through the signal line 42 and the TFT 41.

An alignment film 12 is provided on the upper face of the pixel electrodes 40 on the glass substrate 4, while an alignment film 11 is placed on the lower face of the common electrode 3. The space between these alignment films 11 and 12 is filled with a liquid crystal material so as to form a liquid crystal layer 13. Besides, the numeral 14 represents spacers for maintaining a layer thickness of the liquid crystal layer 13.

The back-light 22 is disposed on the lower layer (rear face) side of the liquid crystal panel 21, and has the LED array 7 placed to face an end face of the light guiding/diffusing plate 6 that forms a light emitting area. As shown in FIG. 6, this LED array 7 includes LEDs for emitting light of the three primary colors, i.e., red (R), green (G) and blue (B), the LEDs being arranged sequentially and repeatedly on a face facing the light guiding/diffusing plate 6. The red, green and blue LEDs are turned on in red, green and blue sub-frames, respectively, and the red, green and blue LEDs are simultaneously turned on in a white sub-frame. The light guiding/diffusing plate 6 guides the light emitted from each LED of this LED array 7 to its entire surface and diffuses it to the upper face, thereby functioning as the light emitting area.

This liquid crystal panel 21 and the back-light 22 capable of emitting red light, green light and blue light in a time-divided manner are stacked one upon another. The ON timing and the colors of emitted light of the back-light 22 are controlled in synchronism with the image data writing scanning/erasing scanning of the liquid crystal panel 21.

In FIG. 3, the numeral 31 is a control signal generation circuit to which a synchronous signal SYN is inputted from a personal computer, and which generates various control signals CS necessary for display. Pixel data PD is outputted from an image memory 30 to the data driver 32. Based on the pixel data PD and a control signal CS for changing the polarity of applied voltage, voltages which are different in polarity and substantially equal in magnitude are applied to the liquid crystal panel 21 through the data driver 32 when performing data writing scanning and data erasing scanning, respectively.

Moreover, the control signal generation circuit 31 outputs a control signal CS to each of a reference voltage generation circuit 34, the data driver 32, the scan driver 33, and a back-light control circuit 35. The reference voltage generation circuit 34 generates reference voltages VR1 and VR2, and outputs the generated reference voltages VR1 and VR2 to the data driver 32 and the scan driver 33, respectively. The data driver 32 outputs signals to the signal lines 42 of the pixel electrodes 40 based on the pixel data PD from the image memory 30 and the control signals CS from the control signal generation circuit 31. In synchronism with the output of the signals, the scan driver 33 scans the scanning lines 43 of the pixel electrodes 40 sequentially on a line by line basis. Further, the back-light control circuit 35 applies a drive voltage to the back-light 22 so as to cause each of the red, green and blue LEDs of the LED array 7 of the back-light 22 to emit light in a time divided manner.

Next, the operation of the liquid crystal display device of the present invention will be explained. To the image memory 30, pixel data PD for display is supplied from the personal computer. After storing the pixel data PD temporarily, the image memory 30 outputs the pixel data PD upon receipt of the control signal CS outputted from the control signal generation circuit 31. The control signal CS generated by the control signal generation circuit 31 is supplied to the data driver 32, scan driver 33, reference voltage generation circuit 34, and back-light control circuit 35. The reference voltage generation circuit 34 generates reference voltages VR1 and VR2 upon receipt of the control signal CS, and outputs the generated reference voltages VR1 and VR2 to the data driver 32 and the scan driver 33, respectively.

When the data driver 32 receives the control signal CS, it outputs a signal to the signal lines 42 of the pixel electrodes 40, based on the pixel data PD outputted from the image memory 30. When the scan driver 33 receives the control signal CS, it scans the scanning lines 43 of the pixel electrodes 40 sequentially on a line by line basis. According to the output of the signal from the data driver 32 and the scanning by the scan driver 33, the TFTs 41 are driven and voltage is applied to the pixel electrodes 40, thereby controlling the intensity of the transmitted light of the pixels.

When the back-light control circuit 35 receives the control signal CS, it applies a drive voltage to the back-light 22 so as to cause the red, green and blue LEDs of the LED array 7 of the back-light 22 to emit light in a time-divided manner, thereby emitting red light, green light, and blue light sequentially with passage of time.

Concrete examples are illustrated below. After washing a TFT substrate having pixel electrodes 40 (pixel number: 640×480, diagonal: 3.2 inches) and a glass substrate 2 having a common electrode 3, they were coated with polyimide and baked for one hour at 200° C. so as to form about 200 Å thick polyimide films as alignment films 11 and 12. Further, these alignment films 11 and 12 were rubbed with a rayon fabric, and an empty panel was produced by stacking these two substrates so that the rubbing directions were parallel and maintaining a gap therebetween by spacers 14 made of silica having an average particle size of 1.6 μm. A ferroelectric liquid crystal material composed mainly of naphthalene-based liquid crystal and showing a bistable electro-optic response was sealed between the alignment films 11 and 12 of this empty panel so as to form a liquid crystal layer 13. The magnitude of spontaneous polarization of the sealed ferroelectric liquid crystal material was 8 nC/cm$^2$. The liquid crystal panel 21 was produced by sandwiching the fabricated panel by two polarization films 1 and 5 arranged in a crossed-Nicol state, and the average molecular axis of the liquid crystal molecular director in the absence of applied voltage was substantially aligned with the polarization axis of one of the polarization films to provide a dark state.

The liquid crystal panel 21 thus fabricated and the above-described back-light 22 comprising the LED array 7 capable of switching surface emission of monochrome colors, red, green and blue, as a light source are stacked one upon another, and a color display is performed by a field-sequential method, according to a later-described drive sequence.

Figure 7:
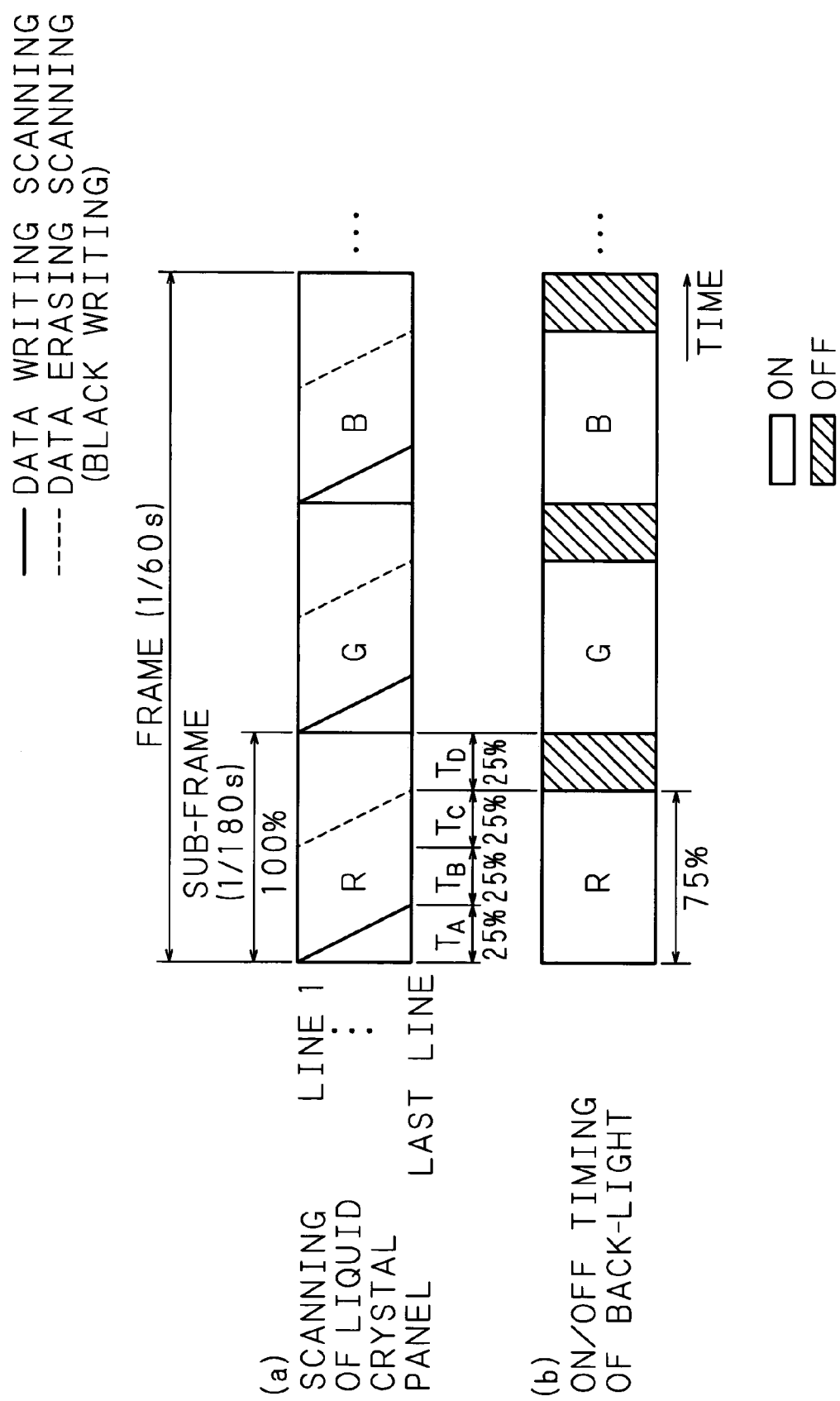
FIG. 7 shows a time chart of display control in a liquid crystal display device (the first embodiment) of the present invention.

FIG. 7 shows a time chart of display control according to the first embodiment, wherein FIG. 7 (a) shows the scanning timing of each line of the liquid crystal panel 21, and FIG. 7 (b) shows the ON/OFF timing of red, green and blue colors of the back-light 22 (LED). One frame is divided into three sub-frames, and, for example, writing/erasing scanning of red image data is performed by turning on the red LED in the first sub-frame, writing/erasing scanning of green image data is performed by turning on the green LED in the next second sub-frame, and writing/erasing scanning of blue image data is performed by turning on the blue LED in the last third sub-frame within one frame.

In each sub-frame, the time ($T_A$) necessary for data writing scanning and the time ($T_C$) necessary for data erasing scanning are each 25% of the sub-frame. The time ($T_B$) from the end timing of writing scanning to the start timing of erasing scanning is 25% of the sub-frame, and the time ($T_D$) from the end timing of erasing scanning to the start timing of writing scanning of the next color (the next sub-frame) is 25% of the sub-frame. Thus, the relations $T_B+T_C=T_A+T_D$, and $T_B=T_D$ are satisfied.

The back-light 22 (LED) is turned on during the time from the start timing of writing scanning to the end timing of erasing scanning, and turned off during the time from the end timing of erasing scanning to the start timing of writing scanning of the next color (the next sub-frame). As a result, the ON time ($=T_A+T_B+T_C$) of the back-light 22 is 75% of the sub-frame.

Note that the voltages applied to the liquid crystal of each pixel in the data writing scanning and the data erasing scanning are substantially equal in magnitude but opposite in polarity, and the polarity of applied voltage is adjusted so as to obtain a higher light transmittance in the writing scanning. Besides, the frame frequency is 60 Hz.

As a result of performing such a display, it is possible to achieve a screen brightness of 176 cd/m² with respect to the brightness of 1850 cd/m² of the back-light unit. Thus, the light utilization efficiency is as high as 9.5%. Besides, the power consumed by the back-light at this time is 1.1 W.

Figure 1:
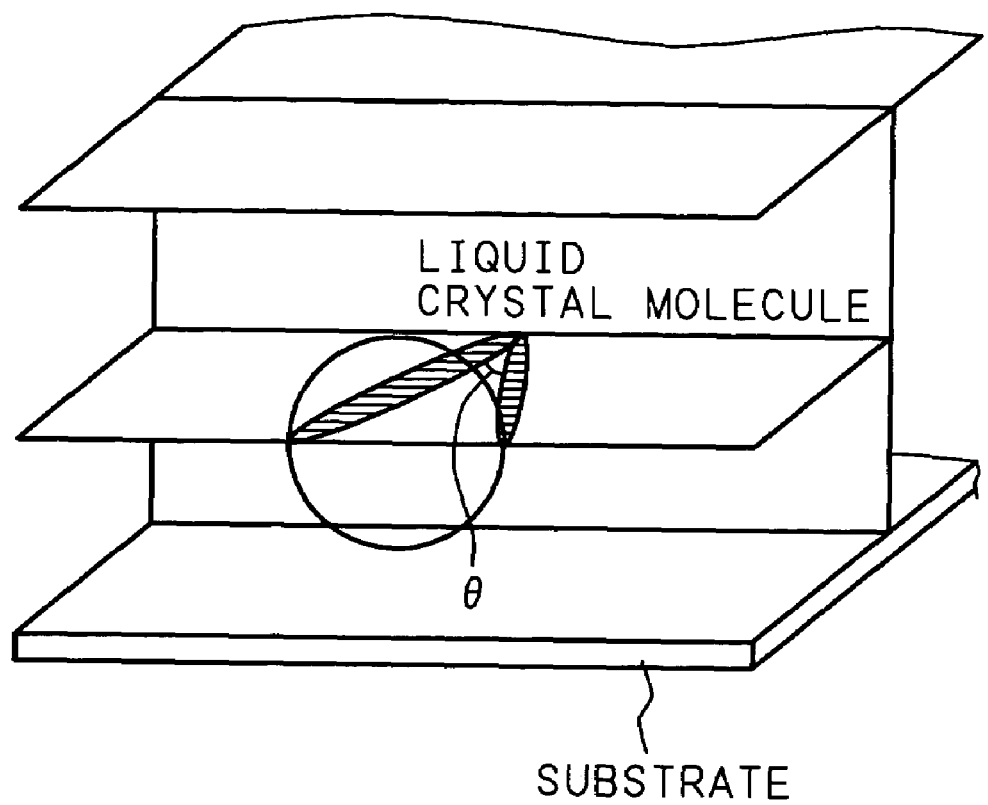
FIG. 1 is an illustration showing an alignment state of a liquid crystal molecule in a ferroelectric liquid crystal panel.
Figure 2:
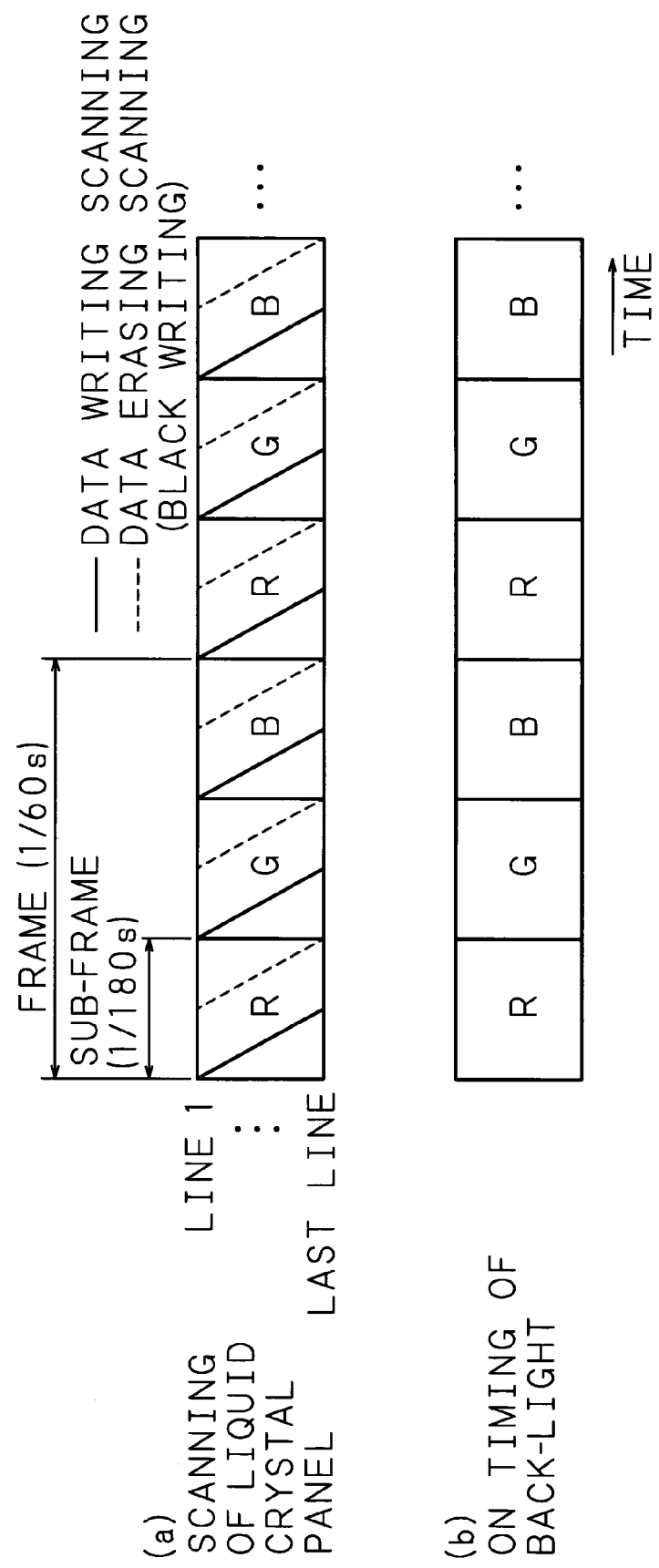
FIG. 2 shows a time chart of display control in a conventional liquid crystal display device.

With the use of the same liquid crystal panel and back-light as in the first embodiment, a color display is performed according to a conventional drive sequence as shown in FIG. 2 (in each sub-frame, the time ($T_A$) necessary for data writing scanning and the time ($T_C$) necessary for data erasing scanning are each 50% of the sub-frame, and the time ($T_B$) from the end timing of writing scanning to the start timing of erasing scanning and the time ($T_D$) from the end timing of erasing scanning to the start timing of writing scanning of the next color (the next sub-frame) are each 0% of the sub-frame). A screen brightness of 174 cd/m² is obtained with respect to the brightness of 2465 cd/m² of the back-light unit, and the light utilization efficiency is as low as 7.1%. Besides, the power consumed by the back-light at this time is as high as 1.5 W.

When the displayed image quality in the first embodiment based on FIG. 7 and the displayed image quality in the conventional example based on FIG. 2 are compared, there seemed to be no difference between them. On the other hand, in the first embodiment including a time in which the back-light is turned off, the black brightness is decreased and the contrast ratio is improved by about 1.3 times compared to the conventional example. Further, with the improvement in the contrast ratio, mixing of colors is reduced, and the purity of displayed colors is improved.

Second Embodiment

The following description will explain the second embodiment in which a liquid crystal material to be used and $T_A$, $T_B$, $T_C$, $T_D$ are different from those in the first embodiment. Since the circuit structure and operation of the liquid crystal display device are the same as those in the first embodiment, the explanation thereof is omitted.

First, in exactly the same manner as in the first embodiment, an empty panel was fabricated. A ferroelectric liquid crystal material showing the phase sequence of isotropic phase-cholesteric phase-chiral smectic C phase from the higher temperature side and a monostable electro-optic response was sealed between the alignment films 11 and 12 of this empty panel to form a liquid crystal layer 13, and an alignment process was executed by applying a DC voltage of 10 V to the liquid crystal layer 13 in a temperature range of ±3° C. from the transition temperature to the chiral smectic C phase from the cholesteric phase (100 to 94° C.). In the alignment process, the liquid crystal was heated to the isotropic phase (120° C.) once, and then cooled down to room temperature (25° C.) by fixing the cooling rate at −1° C./minute. With this alignment process, uniform liquid crystal alignment was obtained. The magnitude of spontaneous polarization of the sealed liquid crystal material was 11 nC/cm². A liquid crystal panel 21 was produced by sandwiching the fabricated panel by two polarization films 1 and 5 arranged in a crossed-Nicol state, and the average molecular axis of liquid crystal molecular director in the absence of applied voltage was substantially aligned with the polarization axis of one of the polarization films to provide a dark state.

The liquid crystal panel 21 thus fabricated and the above-described back-light 22 comprising the LED array 7 capable of switching surface emission of monochrome colors, red, green and blue, as a light source are stacked one upon another, and a color display is performed by a field-sequential method, according to a later-described drive sequence.

Figure 8:
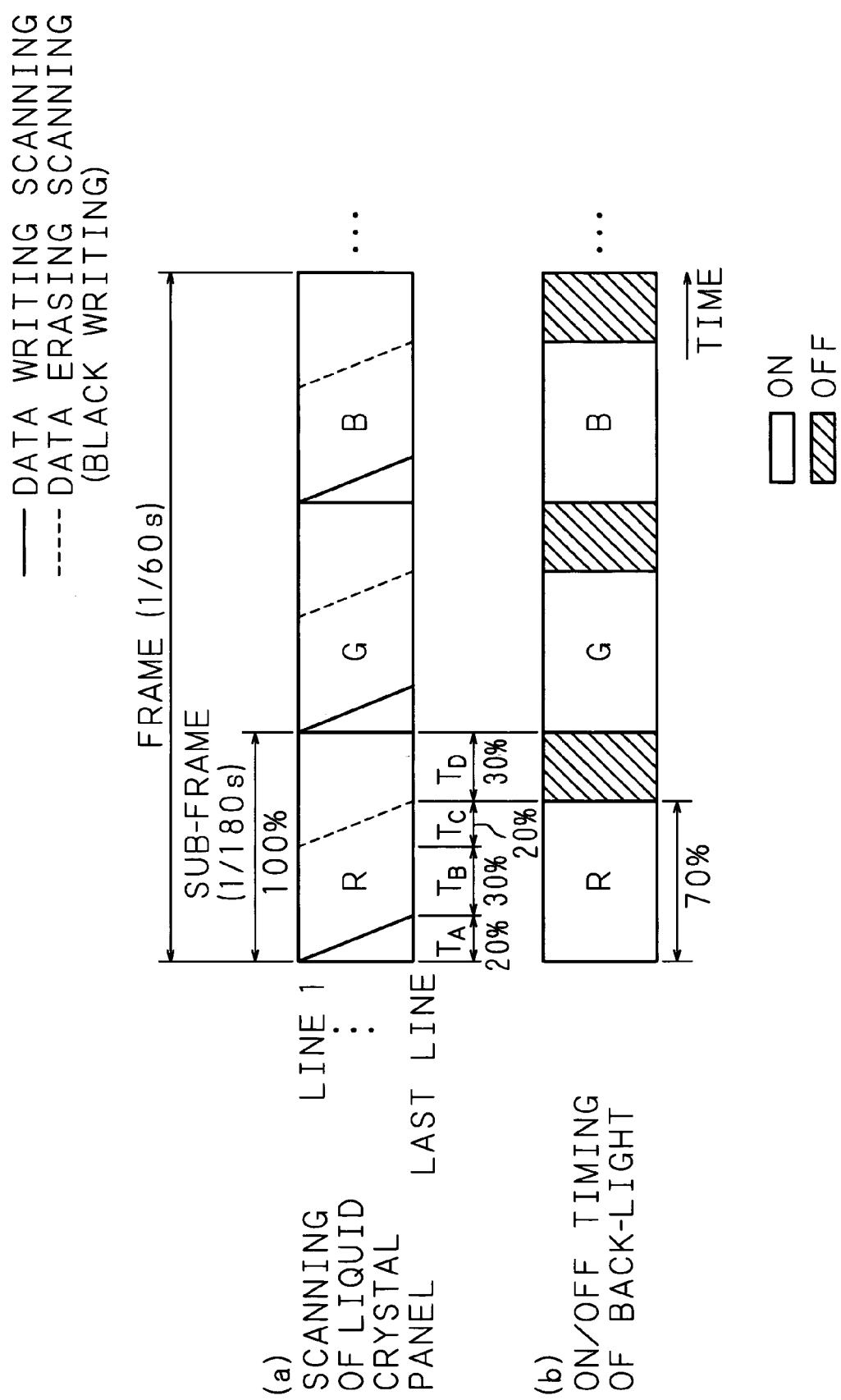
FIG. 8 shows a time chart of display control in a liquid crystal display device (the second embodiment) of the present invention.

FIG. 8 shows a time chart of display control according to the second embodiment, wherein FIG. 8 (a) shows the scanning timing of each line of the liquid crystal panel 21, and FIG. 8 (b) shows the ON/OFF timing of red, green and blue colors of the back-light 22 (LED).

In each sub-frame obtained by dividing one frame into three sub-frames, the time ($T_A$) necessary for data writing scanning and the time ($T_C$) necessary for data erasing scanning are each 20% of the sub-frame, the time ($T_B$) from the end timing of writing scanning to the start timing of erasing scanning is 30% of the sub-frame, and the time ($T_D$) from the end timing of erasing scanning to the start timing of writing scanning of the next color (the next sub-frame) is 30% of the sub-frame. Thus, the relations $T_B+T_C=T_A+TD$, and $T_B=T_D$ are satisfied.

Further, similarly to the first embodiment, the back-light 22 (LED) is turned on during the time from the start timing of writing scanning to the end timing of erasing scanning, and turned off during the time from the end timing of erasing scanning to the start timing of writing scanning of the next color (the next sub-frame). As a result, the ON time ($=T_A+T_B+T_C$) of the back-light 22 is 70% of the sub-frame.

Note that the voltages applied to the liquid crystal of each pixel in the data writing scanning and the data erasing scanning are substantially equal in magnitude but opposite in polarity, and the polarity of applied voltage is adjusted so as to obtain a higher light transmittance in the writing scanning. Besides, the frame frequency is 60 Hz.

As a result of performing such a display, it is possible to achieve a screen brightness of 183 cd/m² with respect to the brightness of 1725 cd/m² of the back-light unit. Thus, the light utilization efficiency is as high as 10.6%. Besides, the power consumed by the back-light at this time is as small as 1.0 W.

With the use of the same liquid crystal panel and back-light as in the second embodiment, a color display is performed according to a conventional drive sequence as shown in FIG. 2. The screen brightness is 179 cd/m² with respect to the brightness of 2465 cd/m² of the back-light unit, and the light utilization efficiency is as low as 7.3%. Besides, the power consumed by the back-light at this time is as high as 1.5 W.

When the displayed image quality in the second embodiment based on FIG. 8 and the displayed image quality in the conventional example based on FIG. 2 are compared, there seemed to be no difference between them. On the other hand, in the second embodiment including a time in which the back-light is turned off, the black brightness is decreased and the contrast ratio is improved by about 1.4 times compared to the conventional example. Further, with the improvement in the contrast ratio, mixing of colors is reduced, and the purity of displayed colors is improved.

Third Embodiment

The following description will explain the third embodiment in which the values of $T_A$, $T_B$, $T_C$, $T_D$ are the same as in the first embodiment, but the ON timing of the back-light is varied. Since the circuit structure and operation of the liquid crystal display device are the same as those in the first embodiment, the explanation thereof is omitted. Besides, the structure of the liquid crystal panel, including the liquid crystal material to be used, is the same as that of the first embodiment.

Figure 9:
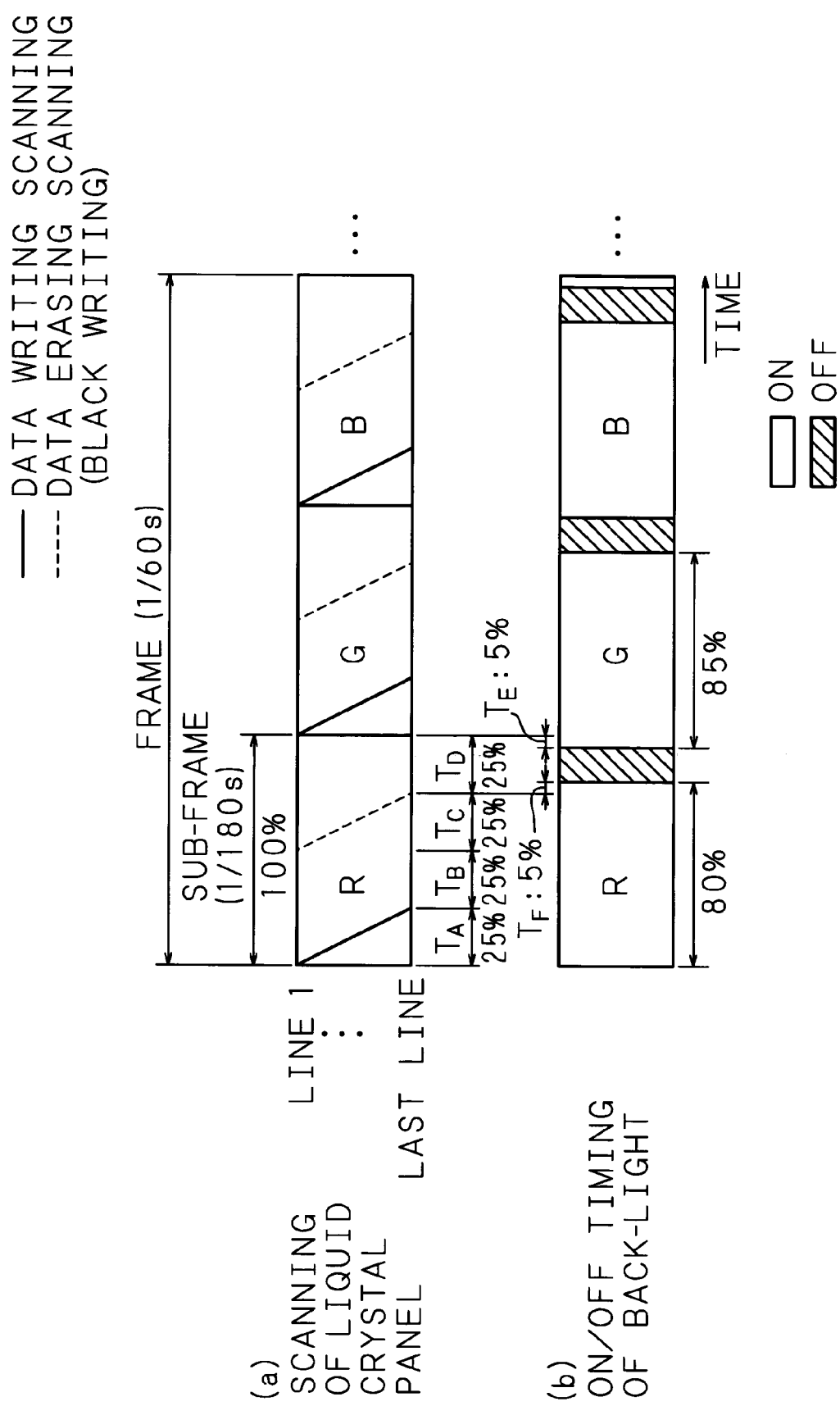
FIG. 9 shows a time chart of display control in a liquid crystal display device (the third embodiment) of the present invention.

FIG. 9 shows a time chart of display control in the third embodiment, wherein FIG. 9 (a) shows the scanning timing of each line of the liquid crystal panel 21, and FIG. 9 (b) shows the ON/OFF timing of the back-light 22.

Similarly to the first embodiment, in each sub-frame obtained by dividing one frame into three sub-frames, the time ($T_A$) necessary for data writing scanning, the time ($T_C$) necessary for data erasing scanning, the time ($T_B$) from the end timing of writing scanning to the start timing of erasing scanning, and the time ($T_D$) from the end timing of erasing scanning to the start timing of writing scanning of the next color (the next sub-frame) are each 25% of the sub-frame.

However, the ON/OFF timing of the back-light 22 (LED) differs from the first embodiment. In the first embodiment, the timing of starting to turn on the back-light 22 and the start timing of writing scanning coincide with each other, and the timing of starting to turn off the back-light 22 and the end timing of erasing scanning coincide with each other. Whereas in the third embodiment, the timing of starting to turn on the back-light 22 precedes the start timing of writing scanning only by a predetermined time ($T_E$), and the timing of starting to turn off the back-light 22 is delayed from the end timing of erasing scanning only by a predetermined time ($T_F$).

In the example shown in FIG. 9, these predetermined times ($T_E$, $T_F$) are each 5% of the sub-frame. Accordingly, the ON time ($=T_E+T_A+T_B+T_C+T_F$) of the back-light 22 is 85% of the sub-frame.

Note that the voltages applied to the liquid crystal of each pixel in the data writing scanning and the data erasing scanning are substantially equal in magnitude but opposite in polarity, and the polarity of applied voltage is adjusted so as to obtain a higher light transmittance in the writing scanning. Besides, the frame frequency is 60 Hz.

As a result of performing such a display, it is possible to achieve a screen brightness of 177 cd/m² with respect to the brightness of 2096 cd/m² of the back-light unit. Thus, the light utilization efficiency is as high as 8.4%. Besides, the power consumed by the back-light at this time is as small as 1.2 W.

When the displayed image quality in the third embodiment based on FIG. 9 and the displayed image quality in the conventional example based on FIG. 2 are compared, there seemed to be no difference between them. On the other hand, in the third embodiment including a time in which the back-light is turned off, the black brightness is decreased and the contrast ratio is improved by about 1.2 times compared to the conventional example. Further, with the improvement in the contrast ratio, mixing of colors is reduced, and the purity of displayed colors is improved.

Fourth Embodiment

The following description will explain the fourth embodiment in which red, green, and blue display data are detected, and, for a sub-frame in which the display data of a color are all black (the grayscale numbers of all the display data are substantially 0), the light source (LED) of the corresponding color is turned off, and the data scanning for the liquid crystal panel is not performed. Note that, in this example of the present invention, the greater the grayscale number of the image data, the brighter the display, and, when the grayscale number is substantially 0, the display becomes a "black" image.

Figure 10:
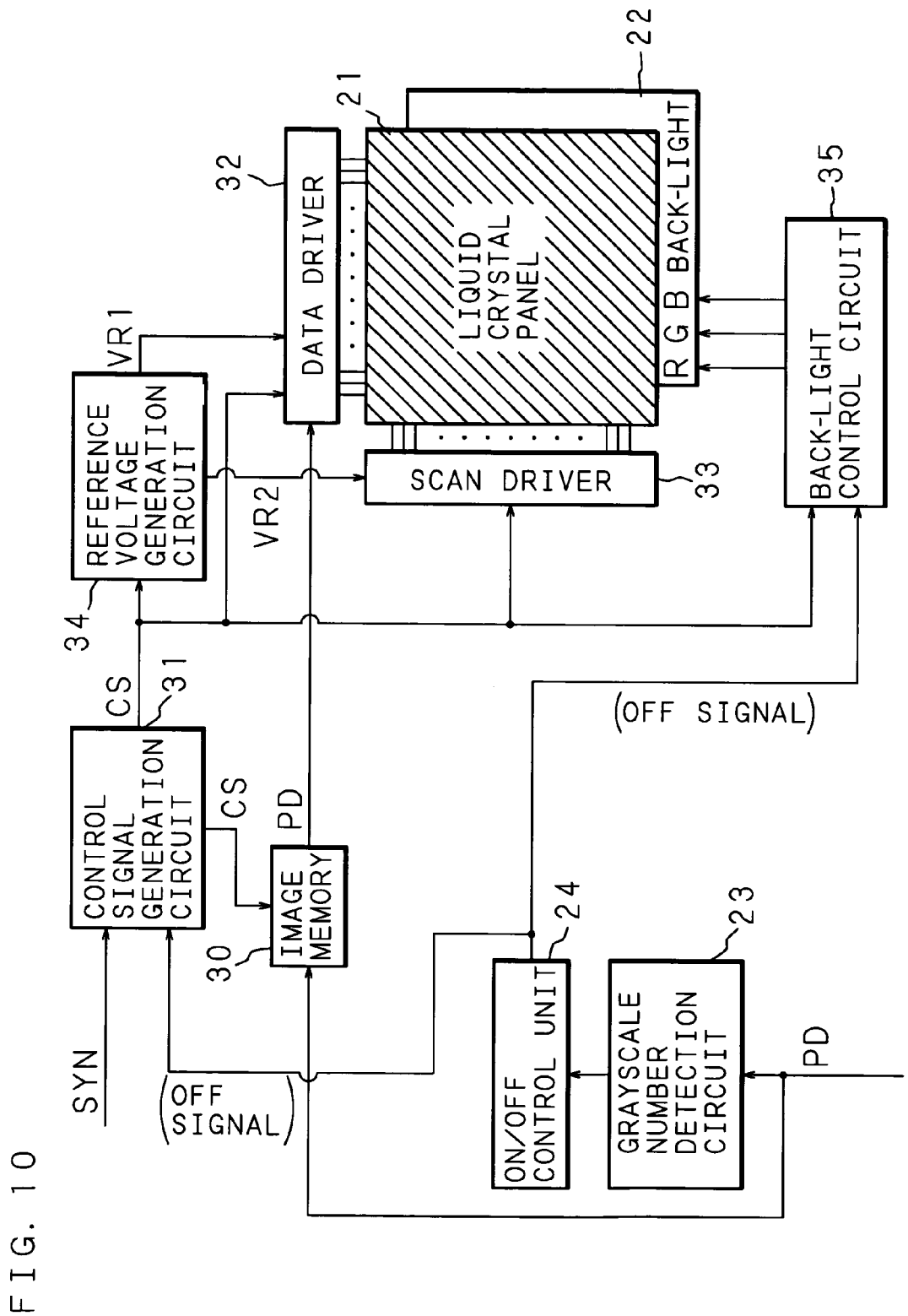
FIG. 10 is a block diagram showing the circuit structure of a liquid crystal display device (the fourth embodiment) of the present invention.

FIG. 10 is a block diagram showing the circuit structure of a liquid crystal display device of the fourth embodiment. In FIG. 10, the members same as, or similar to, those in FIG. 3 are designated with the same numeric numbers. Besides, the liquid crystal panel, including the liquid crystal material to be used, of the fourth embodiment is the same as that of the second embodiment.

In FIG. 10, the numeral 23 is a grayscale number detection circuit into which pixel data PD for display is inputted from an external device, for example, a personal computer, and which detects the grayscale number for each of the colors (red, green, blue); and the numeral 24 is an ON/OFF control unit for controlling the ON/OFF of the LEDs corresponding to each of the colors (red, green, blue), based on the detected grayscale number.

When the grayscale numbers of all the pixel data PD of each color (red, green, blue) corresponding to each sub-frame detected by the grayscale number detection circuit 23 are substantially 0, the ON/OFF control unit 24 outputs an OFF signal to the back-light control circuit 35 and the control signal generation circuit 31. When the OFF signal is inputted, the back-light control circuit 35 turns off the LED in the sub-frame corresponding to the color. Meanwhile, when the OFF signal is inputted, the control signal generation circuit 31 does not send the control signal SC and stops driving of the liquid crystal panel 21.

Figure 11:
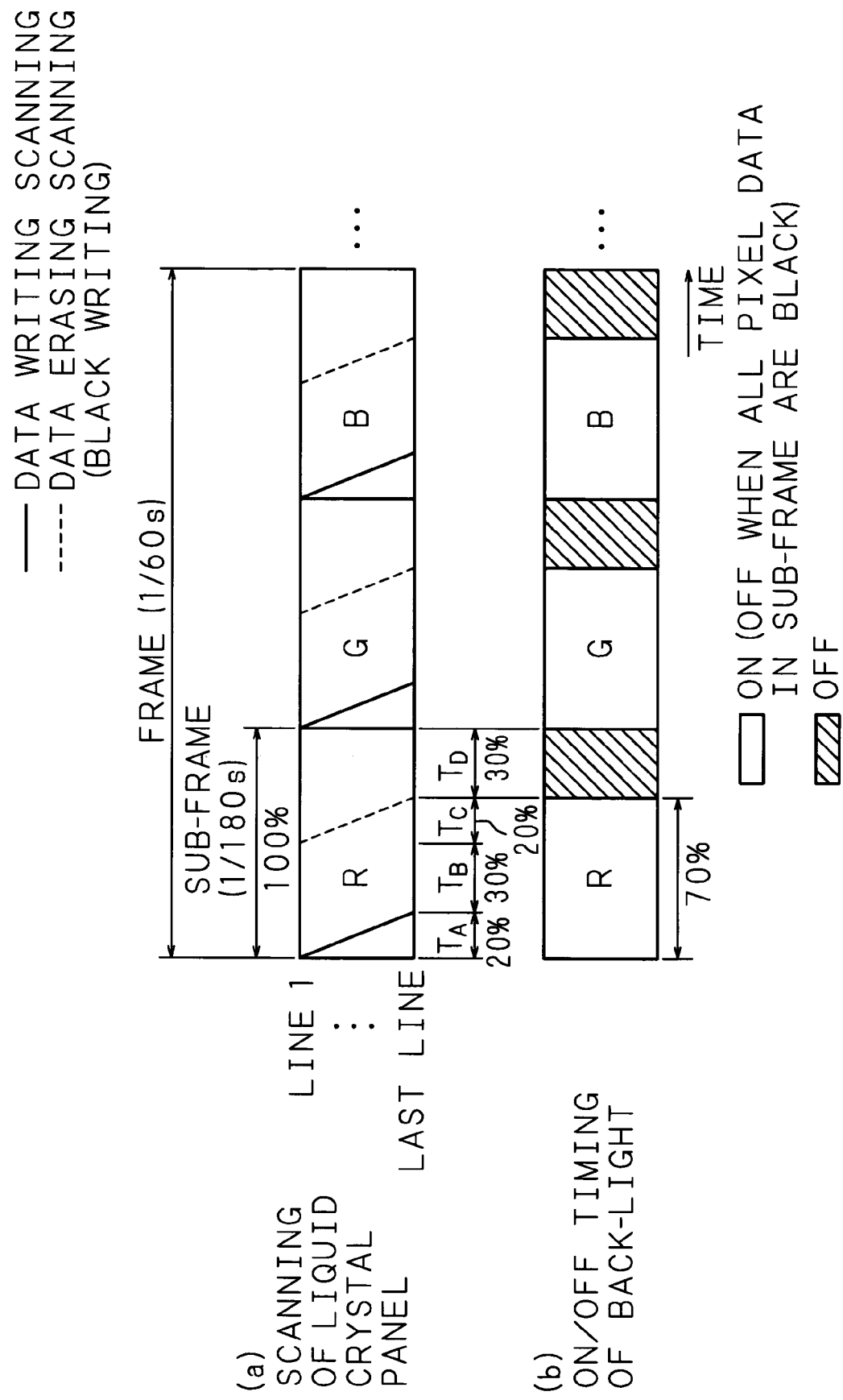
FIG. 11 shows a time chart of display control in the liquid crystal display device (the fourth embodiment) of the present invention.

FIG. 11 shows a time chart of display control in the fourth embodiment, wherein FIG. 11 (a) shows the scanning timing of each line of the liquid crystal panel 21, and FIG. 11 (b) shows the ON/OFF timing of each of red, green and blue colors of the back-light 22 (LED).

The drive sequence for the liquid crystal panel of the fourth embodiment is basically the same as the drive sequence (FIG. 8) in the second embodiment. However, the grayscale number of each color (red, green, blue) of display data is detected by the grayscale number detection circuit 23, and, when the detected grayscale numbers of all pixel data within a sub-frame are substantially 0, the ON/OFF control unit 24 sends an OFF signal to the back-light control circuit 35, while, in a sub-frame in which the grayscale numbers of all pixel data of each color are substantially 0, i.e., in a sub-frame in which all the pixel data of each color are "black", the LED corresponding to the color is not turned on and an OFF signal is sent to the control signal generation circuit 31 from the ON/OFF control unit 24 so as to stop driving of the liquid crystal panel 21.

With the display of the fourth embodiment, it is possible to achieve a screen brightness of 183 cd/m² with respect to the brightness of 1725 cd/m² of the back-light unit. Thus, the light utilization efficiency is as high as 10.6%. Besides, the power consumed by the back-light at this time is as small as 1.0 W.

In the case of a full-color display of a natural image and a black-and-white display, the power consumed by the back-light is 1.0 W. However, in the case of monochrome displays (such as black-and-red, black-and-green, and black-and-blue displays), the back-light is not turned on depending on a detection result of display data, and consequently a further reduction in power consumption is achieved and the black-and-green display consumes very little power of 0.28 W.

Like the fourth embodiment, a display is performed according to the conventional drive sequence in which the LED is turned on at all times in each of the red, green and blue sub-frames without detecting the grayscale numbers of red, green and blue display data. As a result, not only a full-color display of a natural image and a black-and-white display, but also monochrome displays (black-and-red, black-and-green, and black-and-blue displays) consume power of 1.0 W. When the displayed image quality in the fourth embodiment and that in the conventional example are compared, there seemes to be no difference between them.

Fifth Embodiment

In the fifth embodiment, inputted pixel data of three colors, red, green and blue, are converted into pixel data of four colors, red, green, blue and white, and a full-color display is performed by using the converted pixel data of four colors. First, the conversion technique is explained.

Figure 12A:
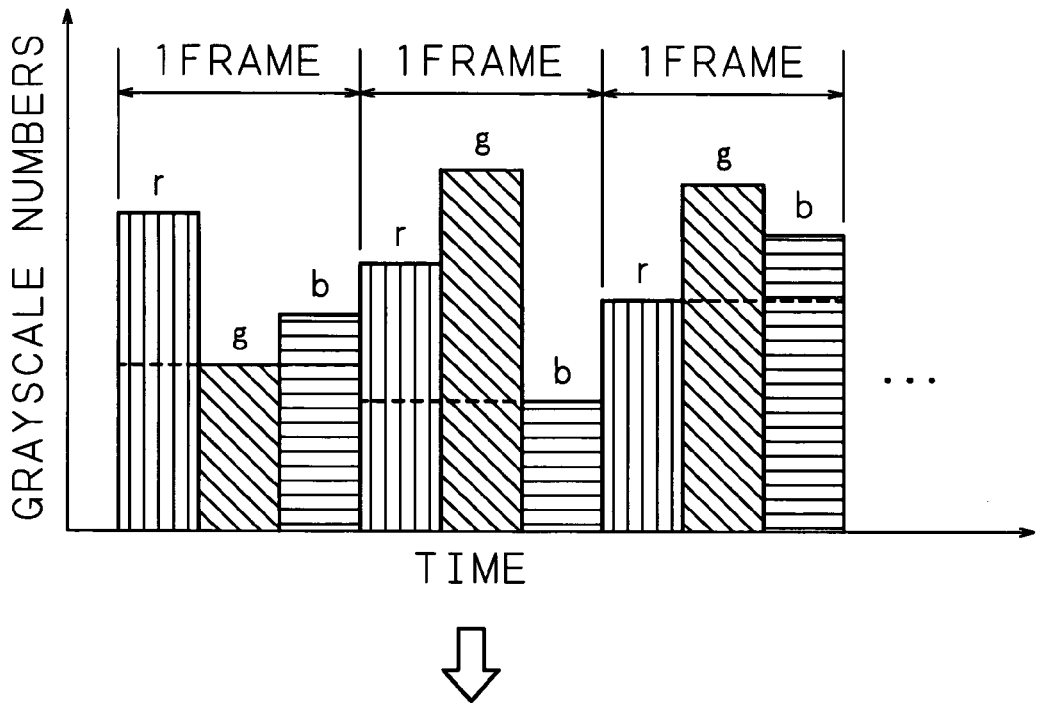
FIGS. 12A and 12B are views showing an example of conversion of pixel data in a liquid crystal display device (the fifth embodiment) of the present invention.
Figure 12B:
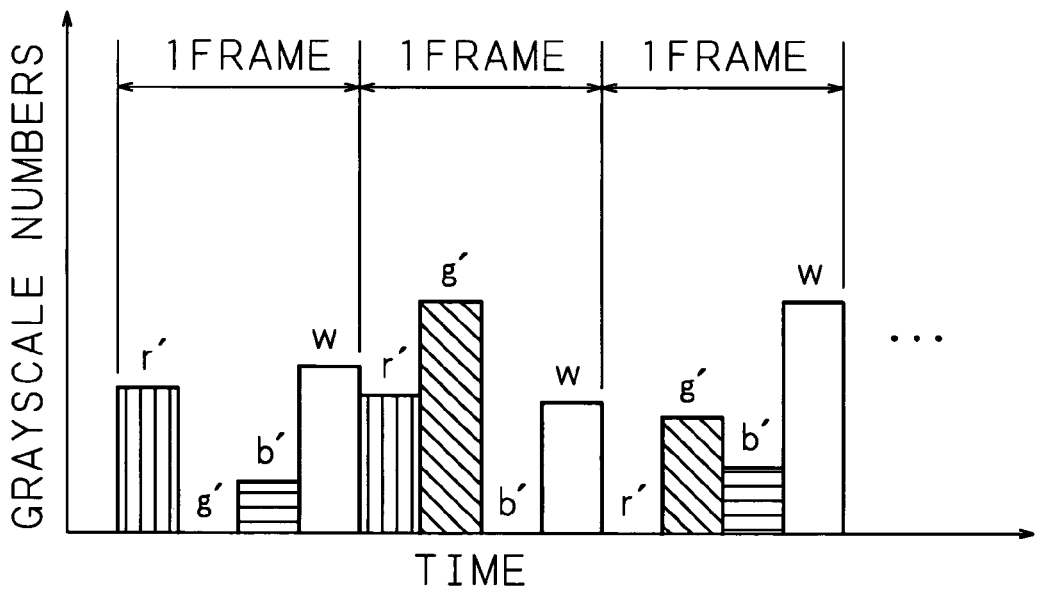

FIG. 12A shows the original grayscale numbers of red (r), green (g) and blue (b) in each frame, and FIG. 12B shows the grayscale number of red (r'), green (g'), blue (b') and white (w) in each frame after conversion. In each frame, the grayscale numbers of the red, green and blue pixel data are compared to each other so as to detect the lowest grayscale number. For example, in the first frame shown in FIG. 12A, the grayscale number of the green display data is the lowest. In this case, in the sub-frames of red display and blue display, a red display and a blue display corresponding to grayscale numbers (r'=r−g, b'=b−g) obtained by subtracting the grayscale number (g) of green from the respective grayscale numbers (r, b) of red and blue before comparison.

In a sub-frame of white display that is a mixed color of red, green and blue, a white display (w=g) corresponding to the grayscale number (g) of green is performed. Besides, in a sub-frame of green display, a green display corresponding to a grayscale number (g'=g−g) obtained by subtracting the grayscale number (g) of green from the grayscale number (g) of green before comparison is performed. However, since the grayscale number (g') resulting from the subtraction is 0, this display is generally a "black" image.

In the fifth embodiment, in the green sub-frame that shows the "black" image, the green LED is turned off. According to such a conversion process, since the grayscale number of at least one color after conversion becomes 0, the probability of making the light source off is larger than that in the fourth embodiment, thereby achieving a further reduction in power consumption.

Furthermore, in the fifth embodiment, the irradiation region of light to be incident on the liquid crystal panel 21 is divided into a plurality of regions, and the ON/OFF of the light source (LED) corresponding to each color is controlled according to the grayscale number of pixel data of each color.

Figure 13:
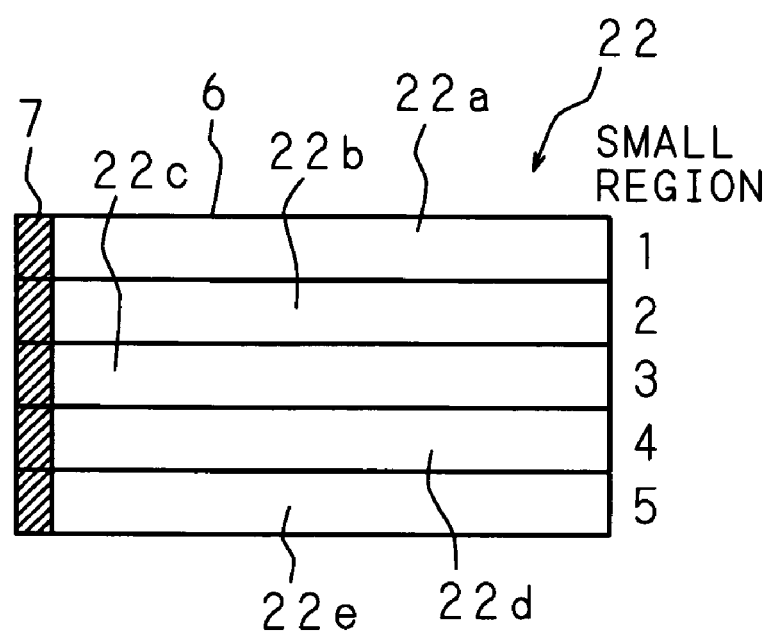
FIG. 13 is a view showing an example of dividing the back-light of the liquid crystal display device (the fifth embodiment) of the present invention.

By dividing the region of the back-light 22 into five small regions 22a through 22e as shown in FIG. 13, the irradiation region of light on the liquid crystal panel 21 is divided into five small irradiation regions. Besides, in addition to control of the ON/OFF of the LED of each color in synchronism with the scanning of the liquid crystal panel 21, the grayscale numbers of red, green, blue, and white pixel data are detected for each of the small irradiation regions, and, when the grayscale numbers of all the pixel data in a small irradiation region of a color are substantially 0, the LED corresponding to the color is turned off in the small irradiation region.

Figure 14:
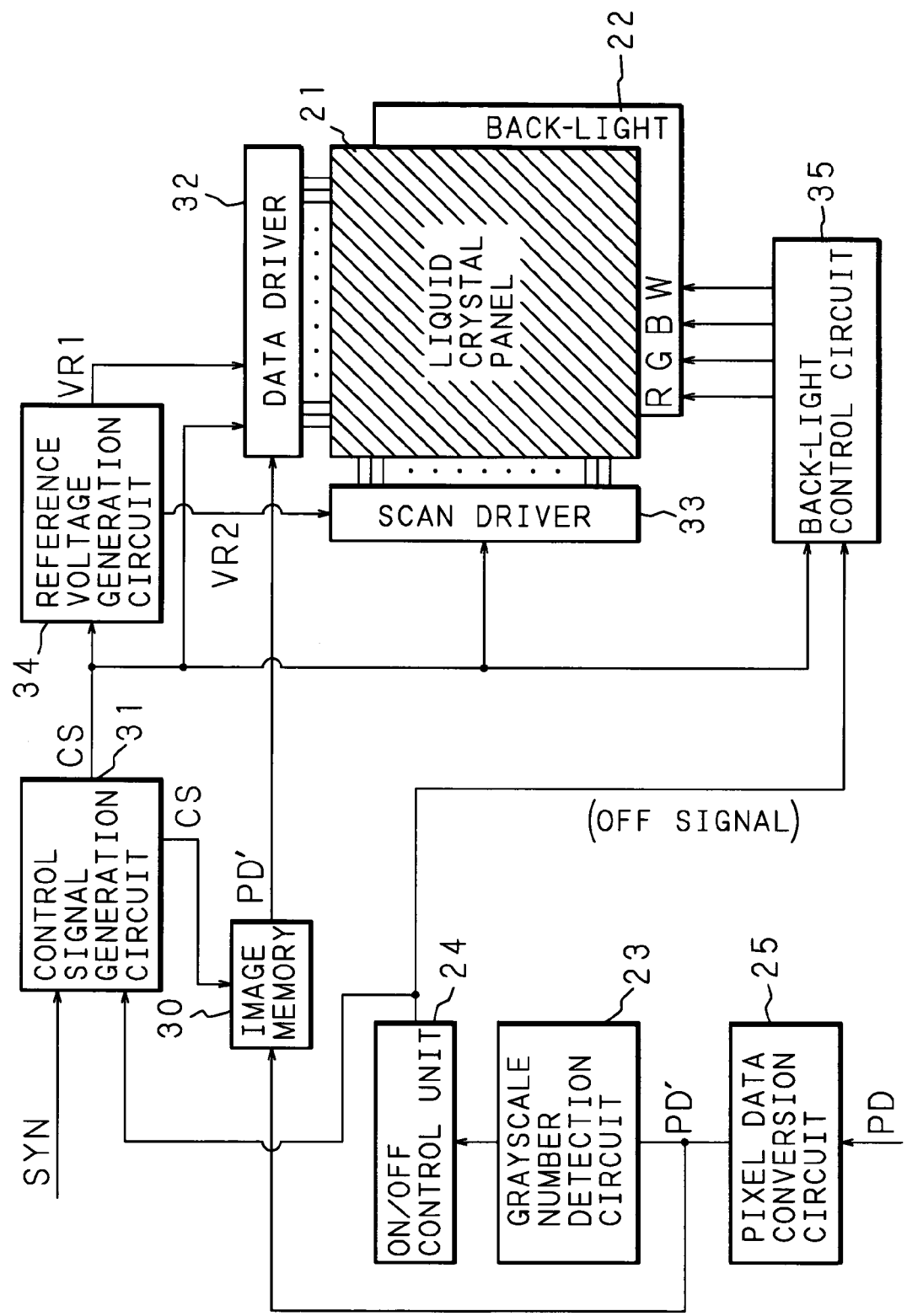
FIG. 14 is a block diagram showing the circuit structure of the liquid crystal display device (the fifth embodiment) of the present invention.

FIG. 14 is a block diagram showing the circuit structure of a liquid crystal display device of the fifth embodiment. In FIG. 14, the members similar to, or the same as, those in FIGS. 3 and 10 are designated with the same numeric numbers. Further, the structures of the liquid crystal panel and the back-light are the same as those in the first embodiment. In a white sub-frame, the red, green and blue LEDs of the LED array 7 are simultaneously turned on.

In FIG. 14, the numeral 25 is a pixel data conversion circuit for converting three-color pixel data PD for display, inputted from an external device such as a personal computer, into four-color pixel data PD' for display, according to the above-described technique, and the pixel data conversion circuit 25 outputs the converted pixel data PD' to the grayscale number detection circuit 23 and the image memory 30. The grayscale number detection circuit 23 detects the grayscale number of each color (red, green, blue, white) for each of the five small irradiation regions of the liquid crystal panel 21, and sends the detection results to the ON/OFF control unit 24. When the grayscale numbers of all the converted pixel data PD' of each color (red, green, blue, white) corresponding to each sub-frame detected by the grayscale number detection circuit 23 are substantially 0, the ON/OFF control circuit 24 sends an OFF signal to the back-light control circuit 35 and the control signal generation circuit 31. The back-light control circuit 35 emits light of each of the red, green, blue and white colors in the small irradiation regions from the back-light 22, but, when the OFF signal is inputted, the back-light control circuit 35 turns off the LED in each small irradiation region corresponding to the color. When the OFF signal is inputted, the control signal generation circuit 31 does not send the control signal SC and stops driving of the liquid crystal panel 21.

Note that since the structures and operations of other members such as the control signal generation circuit 31, data driver 32, scan driver 33 and reference voltage generation circuit 34 are basically the same as in the first and fourth embodiments, except that the pixel data PD is changed to converted pixel data PD', the explanation thereof is omitted.

Figure 15:
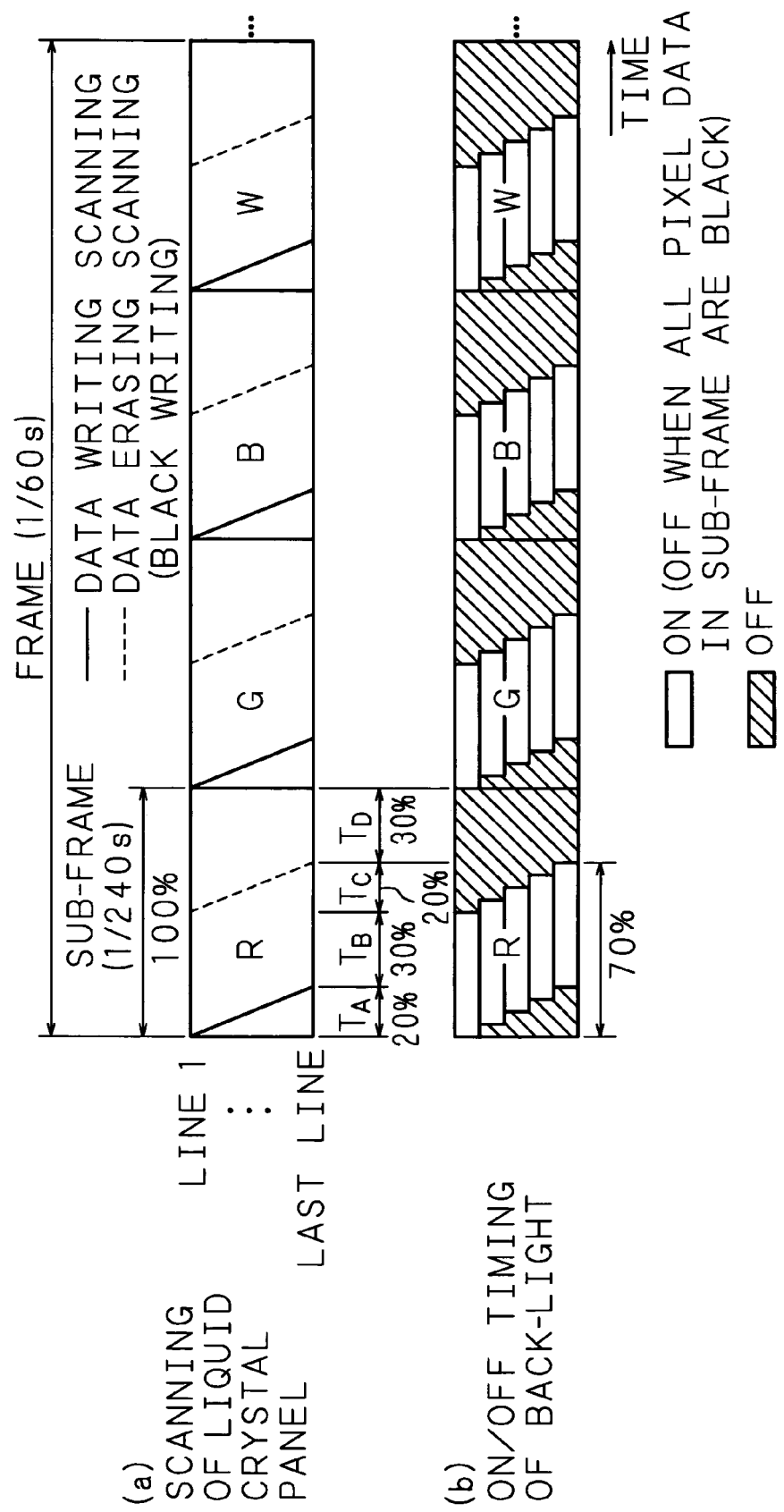
FIG. 15 shows a time chart of display control in the liquid crystal display device (the fifth embodiment) of the present invention.

FIG. 15 shows a time chart of display control in the fifth embodiment, wherein FIG. 15 (a) shows the scanning timing of each line of the liquid crystal panel 21, and FIG. 15 (b) shows the ON/OFF timing of red, green, blue and white colors of the back-light 22 (LED). In each sub-frame obtained by dividing one frame of a frequency of 60 Hz into four sub-frames, the timing of data writing scanning/erasing scanning for the liquid crystal panel 21 is the same as in the third embodiment. However, as shown in FIG. 15 (b), since the ON/OFF of the back-light 22 is controlled in each of the five small irradiation regions of one sub-frame, when an OFF signal is inputted from the ON/OFF control unit 24 for a small irradiation region of a certain color, the LED is turned off in the small irradiation region of this color so as not to emit light of this color. The ON time of the back-light 22 in each small irradiation region is shorter than 70% of the sub-frame.

A liquid crystal panel 21 is fabricated in exactly the same manner as in the above-described second embodiment, and the fabricated liquid crystal panel 21 and the back-light 22 comprising the LED array 7 capable of switching surface emission of monochrome colors, red, green and blue, as a light source are stacked one upon another, and then a color display is performed by a field-sequential method, according to a drive sequence shown in FIG. 15. Note that in a white sub-frame, the red, green, and blue LEDs are simultaneously turned on.

The grayscale number detection circuit 23 detects the grayscale number of each color (red, green, blue, white) of display data after conversion, for each small irradiation region, and, when the grayscale numbers of all the converted pixel data detected in each small irradiation region are substantially 0, the ON/OFF control circuit 24 sends an OFF signal to the back-light control circuit 35. In a small irradiation region in which the grayscale numbers of all the converted pixel data of each color are substantially 0, i.e., in a small irradiation region in which all the converted pixel data of each color are "black", the LED corresponding to the color is not turned on. Besides, when the grayscale numbers of all the converted pixel data detected in each small irradiation region are substantially 0, the ON/OFF control unit 24 sends an OFF signal to the control signal generation circuit 31 so as to stop driving of the liquid crystal panel 21.

As a result of performing such a display, the power consumed by the back-light for a full-color display such as a natural image is 1.7 W, but the consumed power for a black-and-white display is 0.9 W, the consumed power for a monochrome display (black-and-red, black-and-green, or black-and-blue display) becames more smaller, and the black-and-green display consumes very little power of 0.26 W. It is possible to achieve a screen brightness of 180 cd/m$^2$ with respect to the brightness of 1190 cd/m$^2$ of the back-light unit in the black-and-white display, and the light utilization efficiency is as high as 15.1%.

In the case where the back-light is divided into five small regions in the same manner as in the fifth embodiment but a display is performed according to a drive sequence of the conventional example in which the LED is turned on at all times in each of the red, green, blue and white sub-frames without detecting the grayscale numbers of the red, green, blue and white display data, not only a full-color display of a natural image and a black-and-white display, but also monochrome displays (black-and-red, black-and-green, and black-and-blue displays) consume power of 1.7 W.

When the displayed image quality in the fifth embodiment and that in the conventional example are compared, there seemes to be no difference between them, and the displayed image quality in the fifth embodiment is not poorer than that in the conventional example.

Although the above-described embodiments are explained by illustrating, as an example, a filed-sequential type liquid crystal display device using a liquid crystal panel as an optical switching element, the present invention is of course similarly applicable to other display devices using other optical switching elements, for example, a digital micro-mirror device (DMD). Besides, although the LED light source is illustrated, the light source to be used is not particularly limited to the LED light source, and it is possible to use any light source if it can switch, such as EL.

Furthermore, needless to say, the same effects can also be obtained with a color display device using color filters, particularly a color liquid crystal display device using a ferroelectric liquid crystal material. The reason for this is that, in a color-filter type display device, if the liquid crystal panel is provided with color filters by supposing that the color of emitted lights of red, green and blue is white in the above-described embodiments, it is possible to apply the present invention in the same manner.

Figure 16:
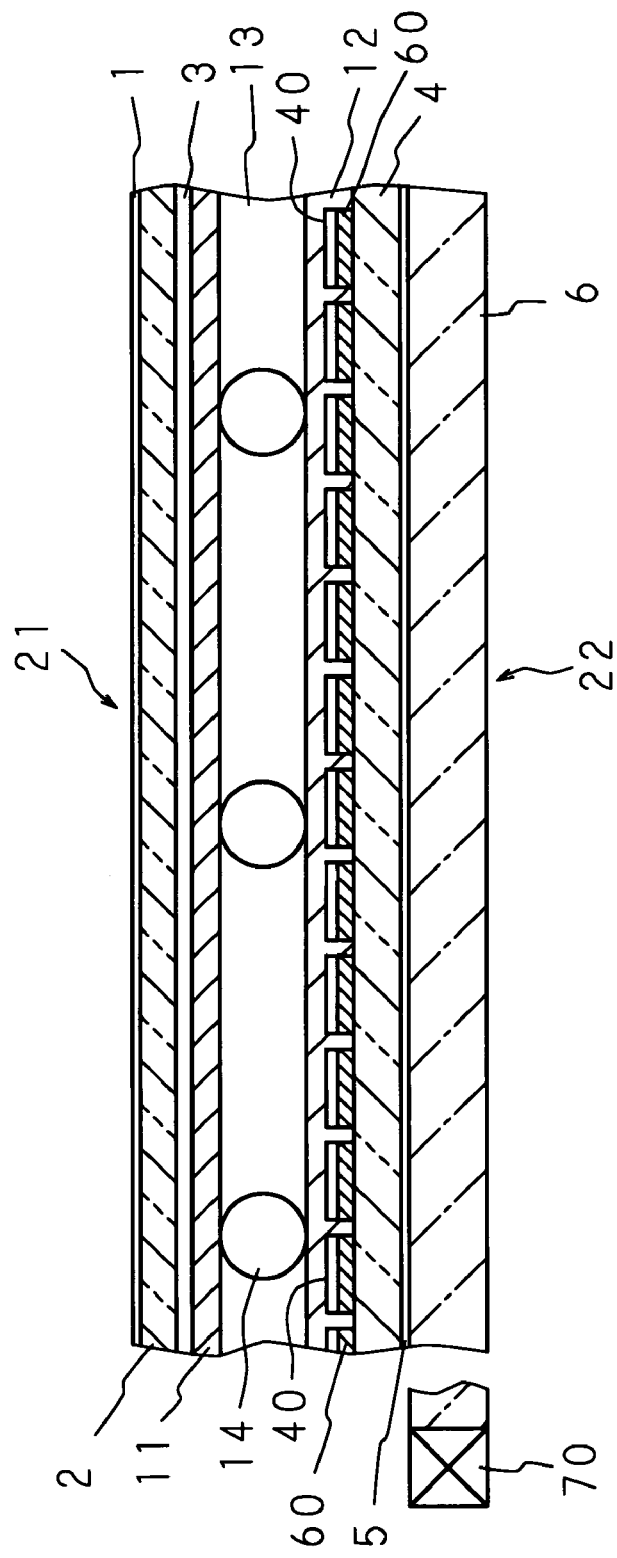
FIG. 16 is a schematic cross sectional view of a liquid crystal panel and a back-light.

FIG. 16 is a schematic cross sectional view of the liquid crystal panel and the back-light of a liquid crystal display device using color-filters. In FIG. 16, the same parts as in FIG. 4 are designated with the same numeric numbers, and the explanation thereof is omitted. Color filters 60 of the three primary colors (R, G, B) are provided under the pixel electrodes 40. Alternatively, color filters are provided between the glass substrate 2 and the common electrode 3 facing the pixel electrodes 40. Besides, the back-light 22 comprises a white light source 70 for emitting white light, and a light guiding/diffusing plate 6.

Such a color-filter type display device can improve the light utilization efficiency without deteriorating the displayed image quality (brightness) by adjusting the time necessary for data writing scanning and erasing scanning in each frame to be 50% or less of the frame and providing a predetermined time between the interruption timing of incidence of light on the liquid crystal panel in one frame and the start timing of incidence of light on the liquid crystal panel in the next frame, more specifically, by executing, in each frame, control similar to control performed in each sub-frame of the above-described field-sequential method.

As described above, in the present invention, since a predetermined time is provided between the interruption of incidence of light of one color on the optical switching element and the incidence of light of the next color on the optical switching element from the light source, it is possible to shorten the light emission time of the light source while maintaining the time necessary for the transmission of the light from the light source through the optical switching element to be equal to or more than a conventional one, i.e., without deteriorating the displayed image quality, particularly without decreasing the brightness, thereby improving the light utilization efficiency of a field-sequential type display device. In addition, even in a color-filter type display device, it is possible to improve the light utilization efficiency in a similar manner.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A field-sequential type display device for performing a display by synchronizing successive switching of lights of a plurality of colors to be incident on an optical switching element from a light source with inputting of display data of each color corresponding to an image to be displayed into said optical switching element, comprising:

a light introducing unit for making light of a corresponding color from said light source incident on said optical switching element in synchronism with a start timing of display data writing scanning on said optical switching element for each color; and an interrupting unit for interrupting the incidence of light of a corresponding color from said light source on said optical switching element in synchronism with an end timing of display data erasing scanning on said optical switching element for each color, wherein a predetermined time is provided between an interruption timing of incidence of light of one color in one frame on said optical switching element and a start timing of incidence of light of the next color in the one frame on said optical switching element.

2. The display device of claim 1, wherein the predetermined time is equal to a time from an end timing of display data writing scanning on said optical switching element to a start timing of display data erasing scanning on said optical switching element.

3. The display device of claim 1, wherein the lights of a plurality of colors to be incident on said optical switching element are red light, green light, and blue light.

4. The display device of claim 1, wherein the lights of a plurality of colors to be incident on said optical switching element are red light, green light, blue light, and white light.

5. The display device of claim 1, further comprising
a control unit for controlling, based on display data, ON/OFF of said light source for emitting light of a color corresponding to the display data.

6. The display device of claim 1, wherein
an irradiation region of light to be incident on said optical switching element is divided, and said display device comprises a control unit for controlling, based on display data in each divided region, ON/OFF of said light source for emitting light of a color corresponding to the display data.

7. The display device of claim 1, further comprising
a stopping unit for stopping scanning on said optical switching element when said light source for emitting light of a color corresponding to display data is turned off.

8. The display device of claim 1, wherein,
said optical switching element is a liquid crystal panel.

9. The display device of claim 8, wherein,
a liquid crystal material used in said liquid crystal panel is a ferroelectric liquid crystal material.

10. The display device of claim 8, wherein,
an applied voltage to said liquid crystal panel during display data writing scanning and an applied voltage to said liquid crystal panel during display data erasing scanning are equal in magnitude and opposite in polarity.

11. A field-sequential type display device comprising: an optical switch element, and a light source, the display device for performing a display by synchronizing successive switching of lights of a plurality of colors to be incident on said optical switching element from said light source with inputting of display data of each color corresponding to an image to be displayed into said optical switching element, wherein
an end timing of display data writing scanning on said optical switching element and a start timing of display data erasing scanning on said optical switching element for each color do not coincide, and a relation $T_B+T_C=T_A+T_D$ is satisfied, where $T_A$ is a time necessary for the writing scanning, $T_B$ is a time from the end timing of writing scanning to the start timing of erasing scanning, $T_C$ is a time necessary for the erasing scanning, and $T_D$ is a time from the end timing of erasing scanning to a start timing of display data writing scanning on said optical switching element for the next color.

12. The display device of claim 11, wherein
the lights of a plurality of colors to be incident on said optical switching element are red light, green light, and blue light.

13. The display device of claim 11, wherein
the lights of a plurality of colors to be incident on said optical switching element are red light, green light, blue light, and white light.

14. The display device of claim 11, further comprising
a control unit for controlling, based on display data, ON/OFF of said light source for emitting light of a color corresponding to the display data.

15. The display device of claim 11, wherein
an irradiation region of light to be incident on said optical switching element is divided, and said display device comprises a control unit for controlling, based on display data in each divided region, ON/OFF of said light source for emitting light of a color corresponding to the display data.

16. The display device of claim 11, further comprising
a stopping unit for stopping scanning on said optical switching element when said light source for emitting light of a color corresponding to display data is turned off.

17. The display device of claim 11, wherein,
said optical switching element is a liquid crystal panel.

18. The display device of claim 17, wherein,
a liquid crystal material used in said liquid crystal panel is a ferroelectric liquid crystal material.

19. The display device of claim 17, wherein,
an applied voltage to said liquid crystal panel during display data writing scanning and an applied voltage to said liquid crystal panel during display data erasing scanning are equal in magnitude and opposite in polarity.

20. A field-sequential type display device for performing a display by synchronizing successive switching of lights of a plurality of colors to be incident on an optical switching element from a light source with inputting of display data of each color corresponding to an image to be displayed into said optical switching element, comprising:
a light introducing unit for making light of a corresponding color from said light source incident on said optical switching element before a start timing of display data writing scanning on said optical switching element for each color; and
an interrupting unit for interrupting the incidence of light of a corresponding color from said light source on said optical switching element after an end timing of display data erasing scanning on said optical switching element for each color.

21. The display device of claim 20, wherein
the lights of a plurality of colors to be incident on said optical switching element are red light, green light, and blue light.

22. The display device of claim 20, wherein
the lights of a plurality of colors to be incident on said optical switching element are red light, green light, blue light, and white light.

23. The display device of claim 20, further comprising
a control unit for controlling, based on display data, ON/OFF of said light source for emitting light of a color corresponding to the display data.

24. The display device of claim 20, wherein
an irradiation region of light to be incident on said optical switching element is divided, and said display device comprises a control unit for controlling, based on display data in each divided region, ON/OFF of said light source for emitting light of a color corresponding to the display data.

25. The display device of claim 20, further comprising
a stopping unit for stopping scanning on said optical switching element when said light source for emitting light of a color corresponding to display data is turned off.

26. The display device of claim 20, wherein,
said optical switching element is a liquid crystal panel.

27. The display device of claim 26, wherein,
a liquid crystal material used in said liquid crystal panel is a ferroelectric liquid crystal material.

28. The display device of claim 26, wherein,
an applied voltage to said liquid crystal panel during display data writing scanning and an applied voltage to said liquid crystal panel during display data erasing scanning are equal in magnitude and opposite in polarity.

29. A display method for performing a field-sequential type display by synchronizing successive switching of lights of a plurality of colors to be incident on an optical switching element from a light source with inputting of display data of each color corresponding to an image to be displayed into said optical switching element, comprising:

making light of a corresponding color from said light source incident on said optical switching element in synchronism with a start timing of display data writing scanning on said optical switching element for each color; and interrupting the incidence of light of a corresponding color from said light source on said optical switching element in synchronism with an end timing of display data erasing scanning on said optical switching element for each color, wherein a predetermined time is provided between an interruption timing of incidence of light of one color in one frame on said optical switching element and a start timing of incidence of light of the next color in the one frame on said optical switching element.

* * * * *